(12) United States Patent
Dey et al.

(10) Patent No.: US 12,496,581 B1
(45) Date of Patent: Dec. 16, 2025

(54) SYSTEMS AND METHODS FOR IN VIVO NANOTOXICITY TESTING

(71) Applicants: Preyojon Dey, Miami, FL (US); Alicia Aron Boymelgreen, Miami, FL (US)

(72) Inventors: Preyojon Dey, Miami, FL (US); Alicia Aron Boymelgreen, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 19/205,555

(22) Filed: May 12, 2025

(51) Int. Cl.
    *B01L 3/00* (2006.01)
(52) U.S. Cl.
    CPC ..... *B01L 3/50273* (2013.01); *B01L 3/502707* (2013.01); *B01L 2300/0654* (2013.01); *B01L 2300/0816* (2013.01); *B01L 2300/1805* (2013.01); *B01L 2400/0487* (2013.01); *B01L 2400/06* (2013.01)
(58) Field of Classification Search
    CPC ........... B01L 3/50273; B01L 3/502707; B01L 2300/0654; B01L 2300/0816; B01L 2300/1805; B01L 2400/0487; B01L 2400/06
    See application file for complete search history.

(56) References Cited

U.S. PATENT DOCUMENTS

| | | | | |
|---|---|---|---|---|
| 10,478,818 | B1 * | 11/2019 | Ball | B01L 3/502707 |
| 2004/0053290 | A1 * | 3/2004 | Terbrueggen | G01N 35/00871 |
| | | | | 205/777.5 |
| 2010/0304494 | A1 * | 12/2010 | Tokhtuev | G01N 35/1097 |
| | | | | 436/100 |
| 2016/0250636 | A1 * | 9/2016 | Kensy | F16K 99/0015 |
| | | | | 506/7 |
| 2021/0382024 | A1 * | 12/2021 | Richter | G01N 33/0016 |

\* cited by examiner

*Primary Examiner* — Brian J. Sines
(74) *Attorney, Agent, or Firm* — SALIWANCHIK, LLOYD & EISENSCHENK

(57) ABSTRACT

Systems and methods are provided for comprehensive in vivo nanotoxicity testing, as well as fabrication methods of chips used for nanotoxicity testing. A three-dimensional (3D)-printed, automated microfluidic chip can be configured for in vivo nanotoxicity testing, and the chip can allow for multi-route (e.g., waterborne and/or foodborne) exposure of marine organisms to small materials (e.g., plastics such as microplastics and/or nanoplastics (NPLs), or metals), providing real-time, in situ monitoring of bioaccumulation and oxygen consumption.

14 Claims, 13 Drawing Sheets

| | Burn-in | 1 | 2 | 3 | 4 |
|---|---|---|---|---|---|
| Print range from (mm) | 0 | 0.025 | 5.5 | 5.55 | 6 |
| Print range to (mm) | 0.025 | 5.5 | 5.55 | 6 | 10.7 |
| Slice thickness (mm) | 0.025 | 0.025 | 0.05 | 0.025 | 0.025 |
| Slice count | 1 | 219 | 1 | 18 | 188 |
| Heater temperature (°C) | 30 | 30 | 30 | 30 | 30 |
| Exposure time (sec) | 5 | 0.9 | 1.5 | 0.9 | 0.9 |
| Fill exposure (%) | 100 | 100 | 100 | 100 | 100 |
| Z compensation (mm) | 0 | 0 | 0 | 0 | 0 |
| XY compensation (mm) | 0 | 0 | 0 | 0 | 0 |
| Approach velocity (mm/sec) | 4.3 | 4.3 | 4.3 | 4.3 | 4.3 |
| Approach pressure limit (g/cm²) | 100 | 100 | 100 | 100 | 100 |
| Traverse timeout range (mm) | 0 | 0 | 0 | 0 | 0 |
| Wait time (after exposure) (sec) | 2 | 0.1 | 0.1 | 0.1 | 0.1 |

US 12,496,581 B1

SYSTEMS AND METHODS FOR IN VIVO NANOTOXICITY TESTING

GOVERNMENT SUPPORT

This invention was made with government support under 2038484 awarded by the National Science Foundation. The government has certain rights in the invention.

BACKGROUND

Plastics are one of the most pervasive pollutants in marine environments, with smaller-sized plastics, such as nanoplastics (NPLs), posing significant but understudied threats to marine organisms. Traditional bulk and end-point testing methods are limited in their ability to provide real-time, in situ assessments of nanotoxicity, hindering a comprehensive mechanistic understanding of their impacts.

BRIEF SUMMARY

Embodiments of the subject invention provide novel and advantageous systems and methods for comprehensive in vivo nanotoxicity testing, as well as fabrication methods of chips used for nanotoxicity testing. A fully three-dimensional (3D)-printed, automated microfluidic chip can be configured for in vivo nanotoxicity testing, specifically addressing the limitations of related art bulk and end-point testing methods. The chip can allow for multi-route (e.g., waterborne and/or foodborne) exposure of marine organisms to small materials (e.g., plastics such as microplastics and/or nanoplastics (NPLs), or metals), providing real-time, in situ monitoring of bioaccumulation and oxygen consumption, two key indicators of nanotoxicity.

In an embodiment, a system for in vivo nanotoxicity testing can comprise: a microfluidic chip that comprises a first chamber, a first inlet channel connected to the first chamber, a first outlet channel connected to the first chamber, a second chamber, a second inlet channel connected to the second chamber, a second outlet channel connected to the second chamber, and a valve disposed between the first chamber and the second chamber; a control channel connected to the valve; a first pump configured to control the valve via the control channel; and a chemical sensor (e.g., an oxygen sensor, a total ammonia nitrogen sensor, a pH sensor) connected to the first chamber. The chemical sensor can be configured to measure in real-time a dissolved analyte (e.g., oxygen) concentration of a fluid in the first chamber and/or a fluid in the second chamber. The chemical sensor can be, for example, an oxygen sensor such as an optical oxygen sensor and can comprise an oxygen molecule-sensitive dye, an optical fiber, and an oxygen meter. The first pump can be a syringe pressure pump. The first chamber can comprise a first intake port configured to intake a first biological sample, and/or the second chamber can comprise a second intake port configured to intake a second biological sample. The system can further comprise: a second pump (e.g., a syringe pressure pump) configured to supply a first fluid to the first chamber via the first inlet channel; and/or a third pump (e.g., a syringe pressure pump) configured to supply a second fluid to the second chamber via the second inlet channel. The first pump, the second pump, and/or the third pump can each or all be controlled via an automated flow control. The system can further comprise: a film heater configured to regulate a temperature of a fluid within at least one of the first chamber and the second chamber; and a controller connected to the film heater and configured to control the film heater. The first inlet channel can comprise a first plurality of micropillars where the first inlet channel meets an entrance to the first chamber, and/or the second inlet channel can comprise a second plurality of micropillars where the second inlet channel meets at an entrance to the second chamber. The valve can be a normally open valve, and it can be configured to be closed during at least a portion of in vivo nanotoxicity testing (e.g., during all but a foodborne exposure portion of testing). The microfluidic chip can be a monolithic structure such that the first chamber, the first inlet channel, the first outlet channel, the second chamber, the second inlet channel, the second outlet channel, and the valve are all part of the monolithic structure (the control channel, the first intake port, the second intake port, the first plurality of micropillars, and/or the second plurality of micropillars can also be part of the monolithic structure). The elements of the microfluidic chip (e.g., the first chamber, the first inlet channel, the first outlet channel, the second chamber, the second inlet channel, the second outlet channel, the valve, the control channel, the first intake port, the second intake port, the first plurality of micropillars, and/or the second plurality of micropillars) can all be positioned as shown in FIG. 1A. For example, openings of the first inlet channel, the second inlet channel, the first outlet channel, the second outlet channel, and/or the control channel can all be positioned on a same surface of the chip (e.g., the bottom as depicted in FIG. 1A; this can lead to ease of use during testing). The system can further comprise a fluorescence microscope disposed proximate to the microfluidic chip and configured to capture microscopic images of a sample within the microfluidic chip during in vivo nanotoxicity testing.

In another embodiment, a method for in vivo nanotoxicity testing can comprise: providing a system as discussed in the previous paragraph (and having any or all of the features described in the previous paragraph); ensuring the valve is closed (e.g., by closing the valve); providing a first fluid to the first chamber via the first inlet; providing a second fluid to the second chamber via the second inlet, where at least one of the first fluid and the second fluid comprises microparticles and/or nanoparticles (NPs) (e.g., NPLs); providing a first biological sample to the first chamber; providing a second biological sample to the second chamber; and measuring in real-time a dissolved oxygen concentration of the first fluid in the first chamber. The method can further comprise capturing microscopic images of the first biological sample and the second biological sample using the fluorescence microscope. The first fluid can be fresh water or salt water (e.g., artificial salt water (ASW)) and/or the second fluid can be fresh water or salt water (e.g., ASW).

In another embodiment, a method of fabricating a system for in vivo nanotoxicity testing can comprise: 3D printing a microfluidic chip that comprises, as part of a monolithic structure: a first chamber; a first inlet channel connected to the first chamber; a first outlet channel connected to the first chamber; a second chamber; a second inlet channel connected to the second chamber; a second outlet channel connected to the second chamber; and a valve disposed between the first chamber and the second chamber. The microfluidic chip can comprise any or all other features discussed in the paragraph before the previous paragraph. The method can further comprise: forming a control channel connected to the valve; connecting a first pump to the control channel, the first pump being configured to control the valve via the control channel; and/or disposing a chemical sensor (e.g., an oxygen sensor) on the microfluidic chip and connected to the first chamber. The method can further comprise: disposing the microfluidic chip proximate to a fluorescence microscope that is configured to capture microscopic images of a sample within the microfluidic chip during in vivo nanotoxicity testing. The method can further comprise: cleaning the microfluidic chip with soap and water; after cleaning, performing ultraviolet (UV) exposure on the microfluidic chip; after performing UV exposure, polishing a bottom surface of the microfluidic chip; and/or after polishing the bottom surface of the microfluidic chip, applying immersion oil to the bottom surface of the microfluidic chip.

BRIEF DESCRIPTION OF DRAWINGS

FIG. 11 shows a photolithography-based chip showing the feasibility of an on-chip nanotoxicity test.

DETAILED DESCRIPTION

Figure 1A:
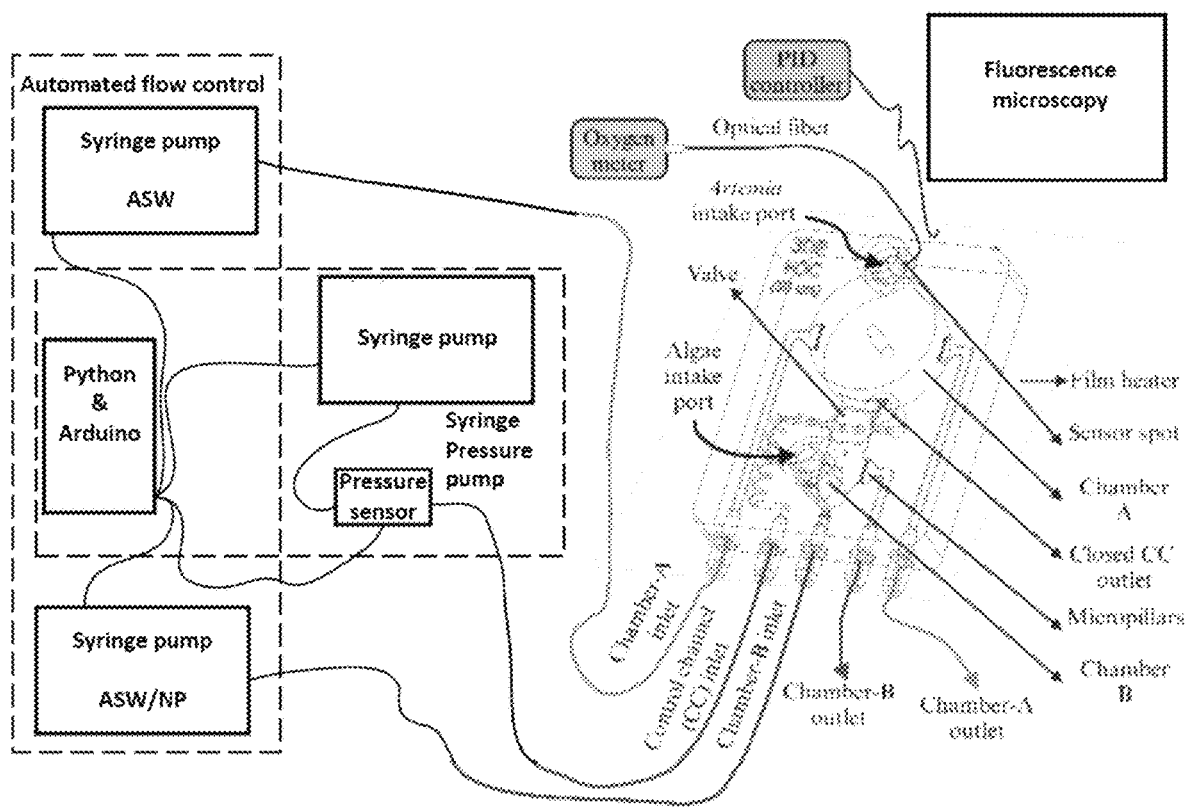
FIG. 1A shows an experimental setup for multi-route in vivo real-time nanotoxicity tests, according to an embodiment of the subject invention.

Embodiments of the subject invention provide novel and advantageous systems and methods for comprehensive in vivo nanotoxicity testing, as well as fabrication methods of chips used for nanotoxicity testing. A fully three-dimensional (3D)-printed, automated microfluidic chip can be configured for in vivo nanotoxicity testing, specifically addressing the limitations of related art bulk and end-point testing methods. The chip can allow for multi-route (e.g., waterborne and/or foodborne) exposure of marine organisms to small materials (e.g., plastics such as microplastics and/or nanoplastics (NPLs), or metals), providing real-time, in situ monitoring of bioaccumulation and oxygen consumption, two key indicators of nanotoxicity.

Key features of embodiments of the subject invention include the fully automated operation and integrated sensors, such as an optical oxygen sensor for real-time monitoring of oxygen consumption and fluorescence microscopy for tracking bioaccumulation of NPLs. This approach eliminates the need for invasive procedures, allowing continuous, non-disruptive observation of organisms under dynamic exposure conditions.

In an embodiment, a fabrication method can include 3D printing the entire chip as a single part, followed by minimal post-processing, such as polishing to enhance optical transparency. This simplified two-step process can significantly reduce production time (e.g., down to about 1.5 hours) and cost compared to related art soft lithography (e.g., polydimethylsiloxane (PDMS)-based soft lithography). The approach can simplify fabrication for non-experts and pave the way for batch production and commercialization.

The 3D-printed chip design can integrate automated flow systems for waterborne exposure and pressure-driven valves for foodborne exposure, creating a dynamic, controlled testing environment that closely mimics natural marine conditions. Embodiments hold broad potential applications beyond marine nanotoxicity testing. The chip can be, for example, adapted for toxicity assessments of various environmental contaminants, drug discovery and screening, and studies on larval development and behavior in a variety of marine species. Its ability to accommodate diverse exposure routes and integrate real-time monitoring makes it a versatile tool for environmental research and other scientific disciplines. The chip can be produced using a 3D printing method followed by minimal polishing, making it cost-effective and highly scalable for batch production. Embodiments provide automated real-time monitoring, such as enabling continuous monitoring of oxygen consumption and/or NPL uptake without disrupting test organisms, offering precise insights into nanotoxicity impacts. Embodiments also allow for both waterborne and foodborne exposure under dynamic conditions, providing a more accurate representation of natural environments compared to static methods. Embodiments provide in situ sensing capabilities, where an integrated sensor (e.g., an integrated optical oxygen sensor) and/or imaging (e.g., fluorescence imaging) provide real-time, non-invasive monitoring of key toxicity indicators, eliminating the need for manual handling and endpoint testing. Embodiments provide a significant advancement in nanotoxicity testing, offering a streamlined, scalable, and automated solution for assessing the impacts of NPLs and other contaminants on marine organisms across trophic levels.

Embodiments of the subject invention provide a fully 3D-printed, automated microfluidic chip designed for multi-route in vivo nanotoxicity testing, which addresses the limitations of conventional methods by offering automated and dynamic exposure conditions alongside real-time monitoring through photography and analyte sensing (e.g., oxygen sensing). This platform simplifies the fabrication process, avoiding the time-consuming soft lithography typically used for microfluidic chips. As discussed in the examples, the chip has been used to assess nanotoxicity in model marine organisms across different trophic levels, such as *Artemia franciscana* (brine shrimp) (instar II and III stages) and a mixture of five microalgae. Polystyrene NPLs, one of the most prevalent plastics in marine environments, were used as the model NPLs and tested in two exposure routes, waterborne and foodborne. The results revealed distinct uptake dynamics; bioaccumulation decreased over time in waterborne exposure but increased in foodborne exposure. Oxygen consumption was elevated in both species during waterborne exposure, compared to the control, while no significant differences were observed in the foodborne group, likely due to delayed interaction with NPLs during algae digestion and the inactivity or mortality of nauplii at the end of the experimental period.

*Artemia* was chosen as the model organism representing a higher trophic level due to its availability and ease of cultivation. Although typically found in hypersaline environments, *Artemia* demonstrates a remarkable ability to adapt to a wide range of salinities, making it a suitable marine model species for various nanotoxicity studies. The examples focused on the early life stage (1-day post-hatching (dph)), as this developmental phase might be highly sensitive to environmental stressors, and any adverse effects during this period can lead to long-term consequences. Additionally, the small size of the organisms at this stage (about 1 millimeter (mm)) makes them ideal for testing within microfluidic systems. A commercially available blend of five microalgae species was selected to represent the lower trophic level, given their fundamental role in maintaining aquatic ecosystem balance, ease of availability and storage, and widespread use as model organisms in nanotoxicity research. Polystyrene (PS) was used as a model NPL because it is one of the most manufactured and found plastics in marine litter. NPLs can interfere with the oxygen consumption of marine animals and, as a result, metabolic processes. To monitor these effects in real-time, an optical oxygen sensor can be incorporated into the microfluidic chip, allowing in situ measurement of oxygen consumption (e.g., in *Artemia*). Concurrently, fluorescence microscopy can be used to image the bioaccumulation of fluorescent NPLs within the organism in situ. Different concentrations and sizes of NPLs were chosen to investigate the impacts on both bioaccumulation and oxygen consumption in real-time. The microfluidic chip offers versatile applications, including toxicity assessments of various contaminants on larvae from a wide range of marine species (such as fish) across different trophic levels.

Unlike related art endpoint assays that provide only static snapshots of nanotoxicity effects, embodiments of the subject invention enable continuous, real-time monitoring of bioaccumulation and oxygen consumption. Integrated sensors, such as an optical oxygen sensor and fluorescence imaging, allow for non-invasive measurements, enhancing data accuracy and reducing handling stress on organisms. Also, while related art nanotoxicity systems often rely on static exposure methods that do not replicate the natural marine environment, potentially causing nonuniform dosing and increased NPL aggregation, embodiments of the subject invention can use automated, continuous flow for waterborne exposure and controlled, timed release for foodborne exposure, better simulating natural, dynamic conditions and leading to more ecologically relevant results. In addition, while related art chips for toxicity testing are often fabricated using soft lithography, which is time-consuming, costly, and requires specialized skills, the one-part, 3D-printed design of embodiments of the subject invention eliminates complex fabrication steps, reducing production time (e.g., to about 1.5 hours), lowering costs, and making the technology more accessible for batch production and commercialization. Unlike related art setups that limit exposure to a single route, chips of embodiments of the subject invention can assess both waterborne and foodborne NPL exposure in the same platform. By using a pressure pump-driven valve to separate chambers, the chip can facilitate controlled exposure conditions, allowing researchers to compare uptake dynamics and toxicity between routes within a single experiment.

While related art in vivo studies on nanotoxicity often require animal displacement and immobilization, causing added stress and potential experimental variability, the integrated, automated sensing within the chips of embodiments of the subject invention eliminates manual handling, thus reducing stress and improving organism welfare while enabling more consistent results. Most related art studies focus on single-species models, such as zebrafish, which may not fully capture the effects of NPLs across trophic levels. The design of chips of embodiments of the subject invention supports testing with multiple marine species, from microalgae to *Artemia franciscana*, offering insights into how NPLs impact different levels within the marine food web. In addition, the streamlined, cost-effective fabrication approach and automation features make embodiments of the subject invention highly scalable for batch production, enabling high-throughput testing. This is ideal for large-scale studies on nanotoxicity impacts, environmental contaminant assessments, and potentially other applications like drug discovery. The automated flow systems, integrated sensors, and controlled environmental parameters of embodiments of the subject invention enable precise, replicable data collection, reducing variability associated with manual handling and endpoint-only assays. This leads to a more comprehensive mechanistic understanding of nanotoxicity in marine organisms. Also, beyond NPL testing, embodiments of the subject invention can serve a range of applications, including toxicity assessment of other contaminants, larval development studies, and aquatic ecosystem monitoring. The adaptability to various marine species and contaminants makes embodiments a versatile tool in environmental toxicology and ecotoxicology research.

Global plastic production has grown throughout time as demand has increased, from 1.5 million tons in 1950 to 368 million tons in 2019, representing a staggering rise of more than 24,000% in just over 70 years. The bulk of plastics are non-biodegradable and only a small amount (about 9%) is recycled, leaving the remainder exposed to the environment and eventually ending up in the oceans. As a result, plastics are the most prevalent marine pollutant. Plastic pollutants disposed of in the ocean can range in size from macro to nano; nevertheless, in natural marine environments, these plastics degrade over time and transform into secondary microplastics and NPLs.

NPLs can be more hazardous to marine animals than larger-sized plastics because of their unique physicochemical properties (smaller size and larger surface area), necessitating investigation into their impact. While in vitro studies are more common, in vivo investigations can provide more realistic and comprehensive information on the impacts, as well as information on possible transfer to higher trophic animals. The behavior of NPLs in freshwater and saltwater differs significantly; NPLs aggregate in saltwater due to decreased electrostatic repulsion. This impacts their bioavailability, and thus their effects on organisms. In addition, marine animals can be exposed to NPLs by both waterborne and foodborne (trophic transfer) exposure routes, and a comparative study of the impacts of both exposure routes is critical, but not well studied in the related art. Moreover, in most of the existing NPL toxicity studies, whether in vivo or in vitro, static exposure is used, which may cause nonuniform dosing and higher aggregation and does not match with the natural dynamic environment. Further, end-point testing and manual handling in existing in vivo studies necessitate animal displacement and immobilization, possibly resulting in additional stress on the test animal and no real-time information on the impacts.

Embodiments of the subject invention provide an automated microfluidic chip for assessing in vivo NPL toxicity. A one-step and one-part approach can be used for the chip fabrication, with only 3D printing to create the entire chip as a single part (e.g., using a commercially available 3D printer resin), with minimal or no post-printing processing. This simplifies the fabrication process for non-experts and significantly reduces turnaround time (e.g., to about 1.5 hour) and cost compared to traditional soft lithography (e.g., PDMS-based soft lithography), paving the way for batch fabrication and commercialization. The 3D printed chip can utilize waterborne exposure (WE) of NPLs via a continuous flow, which may increase NPL bioavailability while also lowering biofouling. The chip can also implement automated foodborne exposure (FE) of NPLs, for example by using a pressure pump-driven on-chip valve to separate two different chambers housing two different marine species with varying trophic levels and exposing them at a predetermined time point.

Figure 5:
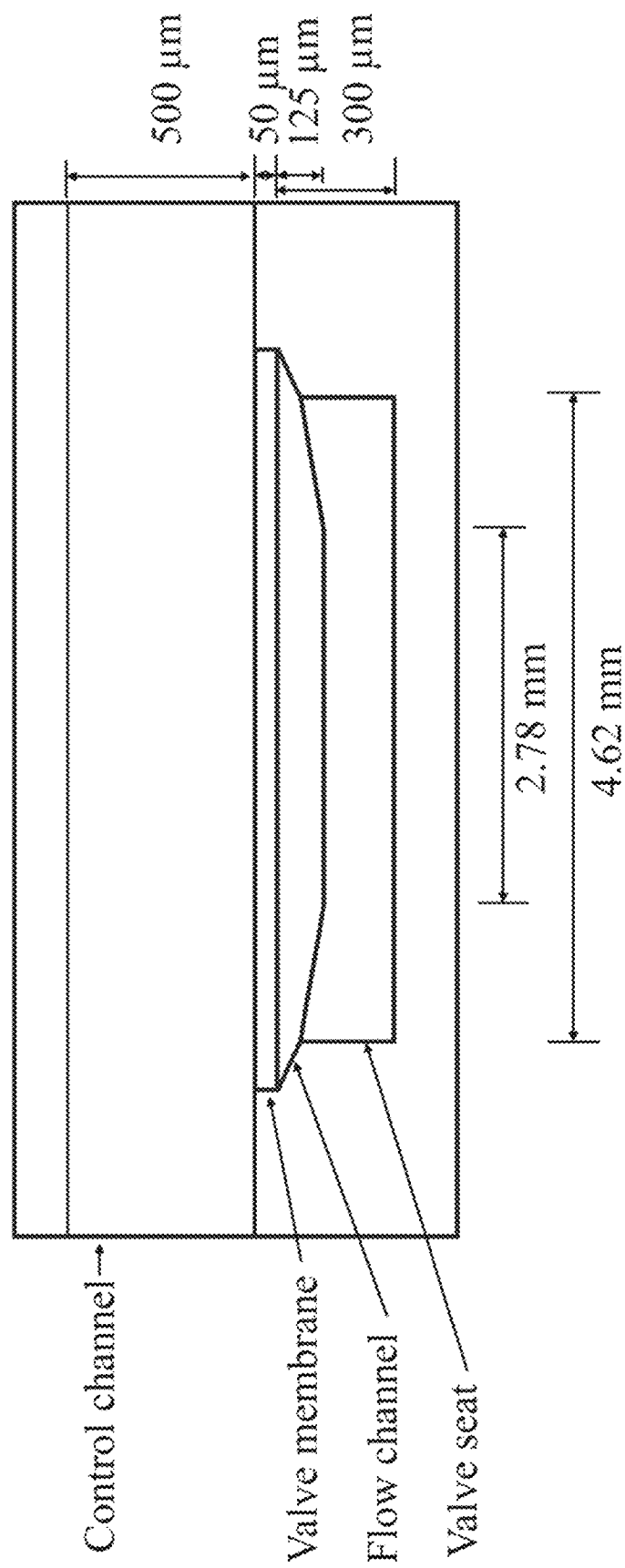
FIG. 5 shows a schematic representation of various valve components, according to an embodiment of the subject invention. Although FIG. 6 lists certain dimensions, these are for exemplary purposes only and should not be construed as limiting.
Figure 6:
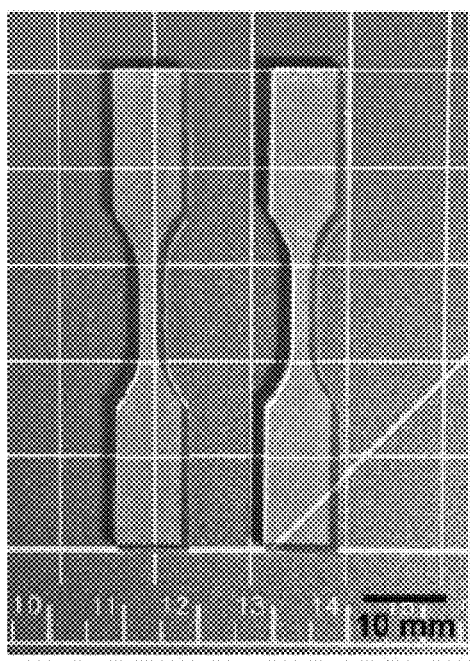
FIG. 6 shows a 3D printed tensile testing specimen of the resin material, according to an embodiment of the subject invention.

FIG. 1A shows an experimental setup of a 3D-printed microfluidic chip designed for automated multi-route in vivo NPL toxicity testing in real-time and in situ, according to an embodiment of the subject invention. The chip can comprise two chambers, which can be referred to as Chamber A for higher trophic marine species (e.g., *Artemia*) and Chamber B for lower trophic species (e.g., algae). Chamber A can be, for example, a cylindrical structure (e.g., with a volume of about 882.6 microliters (L), a diameter of about 15 mm, and a height of about 5 mm). It can incorporate a cylindrical support in the center, configured and/or designed for high-quality 3D printing (see also FIGS. 5A and 5B), along with an inlet and outlet featuring micropillar configurations. The chamber can also include an intake port for the introduction of a sample (e.g., *Artemia nauplii*), which can be securely sealed with a lid. Chamber B can be, for example, a cylindrical chamber (e.g., with a volume of about 72.28 µL, a diameter of about 3.35 mm, and a height of about 8.2 mm), and a majority of the volume of Chamber B can be situated above the chip surface. This chamber can be accessed by removing a lid, allowing for the smooth insertion of a sample (e.g., algae). Chamber B can be connected to a shallow channel (e.g., having a depth of, for example 300 micrometers (µm)), facilitating the smooth transfer of sample (e.g., algae) through the valve (e.g., with a maximum height gap of 125 µm) (see also FIG. 5). The inlet port of Chamber B can be connected to an upward channel leading into Chamber B, which can also feature micropillar structures at the channel's entrance. The outlet of Chamber B, which can be connected to the shallow channel, can include similar micropillar structures. These micropillars can form an array of microchannels at the inlets and outlets of both chambers. Each microchannel can have a geometry of, for example, about 200 µm in length, about 125 µm in width, and about 100 µm in height (though embodiments are not limited to these dimensions), allowing fluid flow while preventing or inhibiting the test animals (e.g., *Artemia*, algae) from escaping the chip.

An optical oxygen sensor including an oxygen molecule-sensitive dye (e.g., OXSP5, Pyroscience), optical fiber, and a meter (e.g., FireSting®-O2, Pyroscience) can be connected to Chamber A (see also FIG. 1A) to obtain real-time information on the dissolved oxygen concentration of the water in the chamber, thereby measuring the oxygen consumption by the sample (e.g., *Artemia nauplii*) (see also; Dey et al., Environmental Science: Nano, doi: 10.1039/D4EN00116H; and Dey et al., Sci Rep, 2023, 13, 6370; both of which are hereby incorporated by reference herein in their entireties). The entire microfluidic chip can be positioned under a microscope (e.g., an epifluorescence microscope, such as Nikon Eclipse Ti2-E) to capture images of the tested sample (e.g., *Artemia nauplii* and in some cases algae) at intervals (e.g., regular intervals, such as 5-minute intervals) and assess NPL uptake via image processing (e.g., using ImageJ software). Additionally, the chip can be positioned on a heater (e.g., a polyimide (PI) film heater, such as 24 V Icstation) connected to a controller (e.g., a proportional-integral-derivative (PID) controller, such as 6-30 V DC Electronic Thermostat Controller, DROK) to regulate the temperature of the water inside the chip (see also FIG. 1A). This temperature control can ensure that the effects of temperature on dissolved oxygen levels or nanotoxicity are minimized during experiments. Chamber A and B inlet channels can allow perfusion of artificial saltwater (ASW) or NPL-infused ASW (when FE was required) (e.g., at a flow rate of 1 microliter per minute (μL/min) in each chamber). During the WE of NPLs to the sample in Chamber A (e.g., *Artemia nauplii*), the outlet channel of Chamber B can be blocked to ensure that all NPL-infused ASW flows into Chamber A. While a flow condition enhances NPL bioavailability, a low flow rate (e.g., 1 μL/min) can be used because higher flow rates lead to increased NPL dosage. Additionally, a higher flow rate can introduce a substantial amount of dissolved oxygen in the water and potentially interfere with the larval oxygen measurements obtained from the on-chip chemical sensor (e.g., oxygen sensor).

Figure 1B:
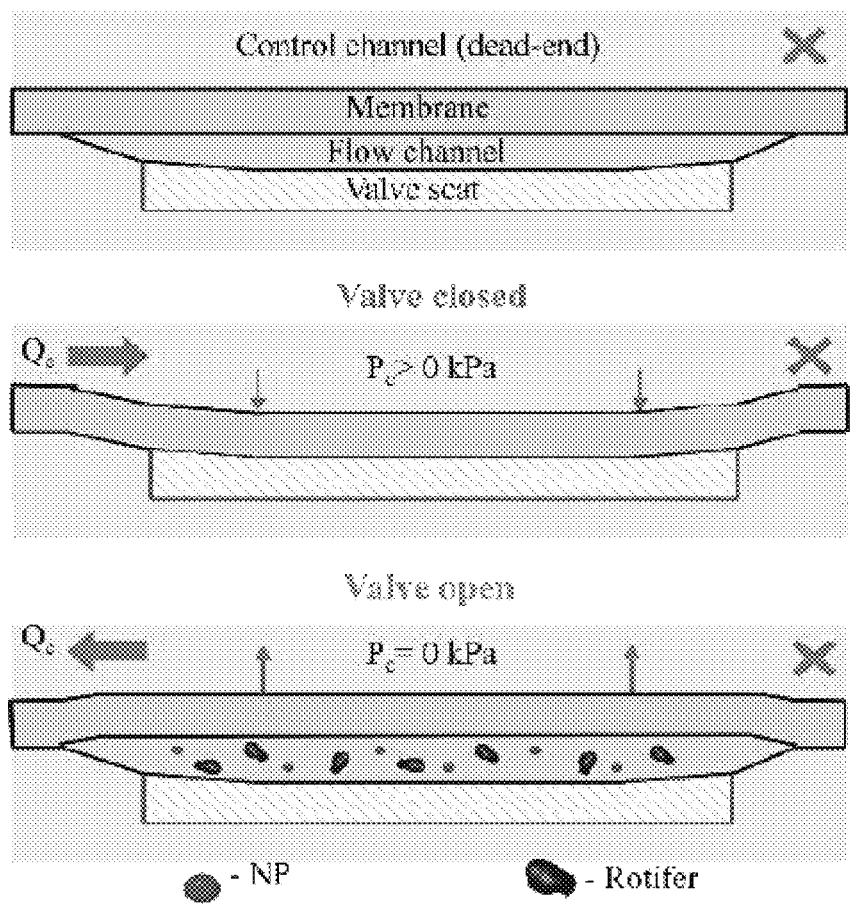
FIG. 1B shows side view of the printed valve structure and operation, according to an embodiment of the subject invention. The top portion of FIG. 1C shows the valve structure; the middle portion of FIG. 1C shows the case where the valve is closed; and the bottom portion of FIG. 1C shows the case where the valve is open.

A valve can connect Chambers A and B (see FIG. 1A), which can normally be open but can be closed during an experiment to separate the test species and then reopened when a sample from Chamber B (e.g., algae) is transferred to chamber A (e.g., for FE) (see also FIG. 1B). The valve can include a valve seat between Chambers A and B (flow channel), a valve membrane, and a control channel (CC) with a closed outlet, all stacked on top of one another (bottom to top, FIG. 1B). Water flow (infusion or withdrawal) in the CC (Qc) with one closed outlet (FIG. 1A) results in positive or zero pressure, forcing the valve membrane to deflect downward or upward, pressing it against the seat or getting away from the seat, and closing or reopening the valve (FIG. 1B), respectively. A syringe pressure pump (e.g., an in-house constructed feedback-controlled syringe pressure pump) can operate the valve automatically via a syringe pump, pressure sensor, and a program (e.g., a Python-based program) (FIG. 1A).

Figures 8, 9:
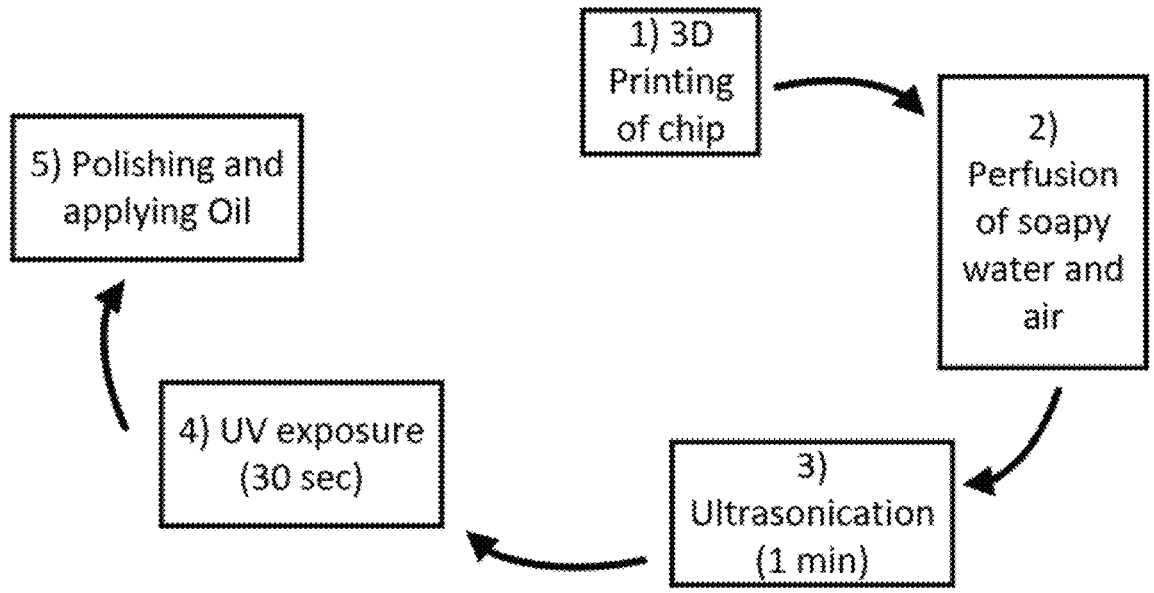
FIG. 8 shows a process flow of a fabrication process of a 3D printed microfluidic chip, according to an embodiment of the subject invention.
FIG. 9 shows a table of 3D printing parameters.

Optimization of 3D printing parameters can be implemented to enhance the optical transparency of the chip. Printing the top surface of Chamber A without any support can lead to distortion due to its large surface area (e.g., about 176.72 square millimeters ($mm^2$)). Introducing a cylindrical support (e.g., with a cross-sectional area of about 0.19 $mm^2$) can minimize distortion without significantly reducing chamber space. Increasing the layer thickness of the first layer atop the chamber (e.g., to 50 μm, from a standard of 25 μm for all other layers) can also help successfully resolve the problem. Also, the burn-in layer (first 3D-printed layer of the chip) thickness can be reduced (e.g., from a standard of 25 sec down to 5 sec) for the resin. This adjustment can maintain the chip's high optical transparency while ensuring it adheres securely to the build platform throughout the printing process. Moreover, apart from those already mentioned in this paragraph, important 3D printing parameters can include a cleaning reagent, a curing step, a polishing step, and application of immersion oil (see also FIG. 8 and the table in FIG. 9). Isopropyl alcohol (IPA), a reagent for cleaning 3D-printed parts, can damage the internal surfaces of the chip chambers. However, cleaning with soapy water and air, though more labor-intensive, effectively leaves the chamber surfaces clean and transparent. After cleaning with soapy water, ultrasonication, and ultraviolet (UV) exposure to remove and cure any excess resin, the chip's bottom surface can be lightly polished (e.g., using sandpapers, such as with 400-grit and 1200-grit sizes). Applying a thin layer of immersion oil (Nikon Type B) to the polished surface can further improve its transparency.

Figure 7:
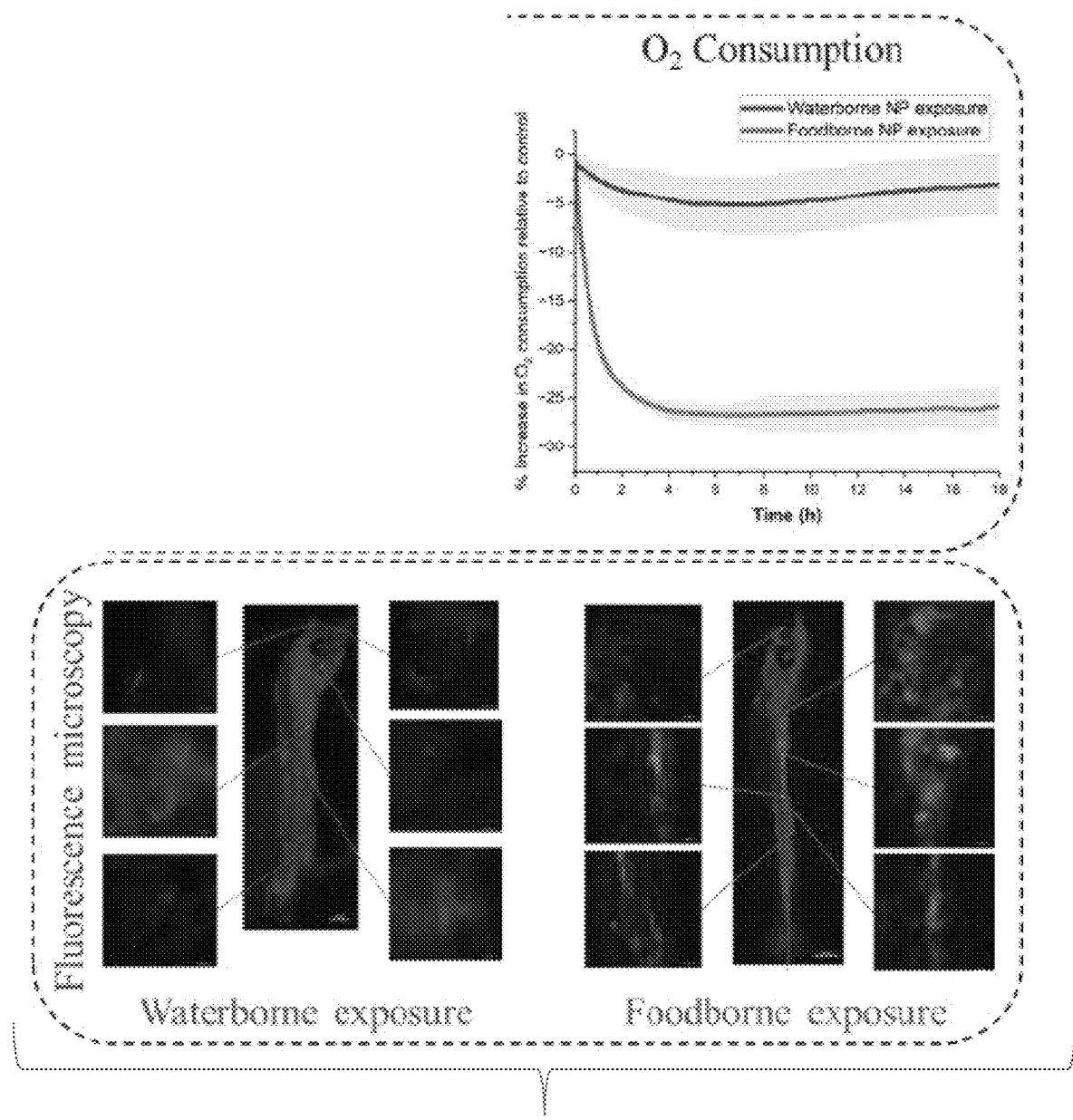
FIG. 7 shows a plot (top right) of increase in oxygen consumption relative to control (in percentage (%)) versus time (in h), showing oxygen consumption. The curve with the higher values of increase in oxygen consumption is for waterborne NPL exposure; and the curve with the lower values of increase in oxygen consumption is for foodborne NPL exposure. The bottom left portion of FIG. 11 shows fluorescence microscopy images of waterborne exposure; and the bottom right portion of FIG. 11 shows fluorescence microscopy images of foodborne exposure.

For fabrication of the chip, PDMS-based soft lithography is one option, as shown in FIG. 7, with a 3D-printed mold to fabricate chips featuring a single chamber with an inlet and outlet. This design can facilitate a continuous nanoparticle (NP) suspension flow (e.g., WE) via a pump (e.g., a syringe pump). Experimental findings from this chip revealed substantial NP uptake in mahi-mahi, especially in their guts, and bioaccumulation through both exposure routes, as observed through fluorescence microscopy. Another fabrication method can include using soft lithography with a dual molding approach, incorporating a valve to initially separate the test animals into two chambers before merging them (e.g., for FE). However, this process is time-consuming and complicated and includes multiple parallel operations requiring numerous tubing. Hence, the most advantageous fabrication process is a 3D-printed "one-step and one-part" process by fabricating the entire three-layer chip with a 3D printer and a transparent resin (e.g., a commercially available high-resolution transparent resin, such as FunToDo Nano Clear). The 3D-printed valve (normally open) can be controlled by pressure adjustments (e.g., via a program, such as a Python program) and a pressure pump, such as a syringe pressure pump). Another syringe pump can ensure a constant flow of saltwater/NP suspension to the rotifer chamber, moving them to another chamber (e.g., during WE) (see also, e.g., FIG. 1A).

Embodiments of the subject invention provide real-time, in situ monitoring, enabling continuous tracking of bioaccumulation and oxygen consumption with non-invasive sensors for enhanced accuracy and reduced organism stress and minimal organism disturbance. Dynamic exposure conditions are not an issue, as natural marine environments can be simulated with automated flow systems for more ecologically relevant results in nanotoxicity studies. Embodiments provide simplified 3D printing fabrication, with a one-part 3D-printed design that reduces production time and costs, making it accessible for batch production. Embodiments provide multi-route exposure capabilities, allowing for simultaneous assessment of waterborne and foodborne exposure, while also enabling comparative studies and broader applicability across trophic levels in a single platform. Embodiments provide high throughput and scalability, as the scalable design can be used for large-scale nanotoxicity studies and high-throughput environmental assessments. The automated systems ensure precise, replicable data, reducing variability and improving study outcomes; and the adaptable platform allows for testing various contaminants and marine species, applicable to environmental toxicology and ecotoxicology research.

Embodiments of the subject invention can be used for nanotoxicity testing (e.g., assessing toxicity of NPLs in marine organisms), marine research (e.g., studying bioaccumulation and oxygen consumption in marine food chains), in vivo toxicity assessment (e.g., testing effects of pollutants on live aquatic organisms), and aquatic ecotoxicology (e.g., evaluating toxicity across different trophic levels). Embodiments may also be used for, e.g., high-throughput screening (e.g., batch testing of various pollutants or nanomaterials), drug discovery (e.g., testing compounds for efficacy and toxicity on marine species), agricultural impact studies (e.g., assessing nanomaterials in soil and water ecosystems), climate impact research (e.g., studying marine species' responses to abiotic stressors like temperature), food safety (e.g., monitoring contaminants in seafood to ensure consumer safety), and/or industrial effluent monitoring (e.g., real-time assessment of toxic discharges in marine ecosystems).

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of embodiments of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

When the term module is used herein, it can refer to software and/or one or more algorithms to perform the function of the module; alternatively, the term module can refer to a physical device configured to perform the function of the module (e.g., by having software and/or one or more algorithms stored thereon).

When ranges are used herein, combinations and subcombinations of ranges (including any value or subrange contained therein) are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

Materials and Methods

FIG. 1A shows an experimental setup of the 3D-printed microfluidic chip used for automated multi-route in vivo NPL toxicity testing in real-time and in situ. The chip included two chambers, which can be referred to as Chamber A for higher trophic marine species (*Artemia*) and Chamber B for lower trophic species (algae). Chamber A was a cylindrical structure with a volume of about 882.6 µL, a diameter of about 15 mm, and a height of about 5 mm. It incorporated a cylindrical support in the center, configured and/or designed for high-quality 3D printing, along with an inlet and outlet featuring micropillar configurations. The chamber also included an intake port for the introduction of *Artemia nauplii*, which was securely sealed with a lid. Chamber B was a cylindrical chamber with a volume of about 72.28 µL, a diameter of about 3.35 mm, and a height of about 8.2 mm, and a majority of the volume of Chamber B was situated above the chip surface. This chamber could be accessed by removing a lid, allowing for the smooth insertion of algae. Chamber B was connected to a shallow channel having a depth of 300 µm, facilitating the smooth transfer of algae through the valve, with a maximum height gap of 125 µm (see also FIG. 5). The inlet port of Chamber B was connected to an upward channel leading into Chamber B, which also featured micropillar structures at the channel's entrance. The outlet of Chamber B, which was connected to the shallow channel, included similar micropillar structures. These micropillars formed an array of microchannels at the inlets and outlets of both chambers. Each microchannel had a geometry of about 200 µm in length, about 125 µm in width, and about 100 µm in height, allowing fluid flow while preventing or inhibiting the test animals (*Artemia*, algae) from escaping the chip.

An optical oxygen sensor including an oxygen molecule-sensitive dye (OXSP5, Pyroscience), optical fiber, and a meter (FireSting®-O2, Pyroscience) was connected to Chamber A (see also FIG. 1A) to obtain real-time information on the dissolved oxygen concentration of the water in the chamber, thereby measuring the oxygen consumption by the sample (*Artemia nauplii*). The entire microfluidic chip was positioned under an epifluorescence microscope (Nikon Eclipse Ti2-E) to capture images of the tested sample (*Artemia nauplii* and in some cases algae) at 5-minute intervals and assess NPL uptake via image processing (using ImageJ software). Additionally, the chip was positioned on a PI film heater (24 V Icstation) connected to a PID controller (6-30 V DC Electronic Thermostat Controller, DROK) to regulate the temperature of the water inside the chip (see also FIG. 1A). This temperature control ensured that the effects of temperature on dissolved oxygen levels or nanotoxicity were minimized during experiments. Chamber A and B inlet channels allowed perfusion of ASW or NPL-infused ASW (when FE was required) at a flow rate of 1 µL/min in each chamber. During the WE of NPLs to the sample in Chamber A (*Artemia nauplii*), the outlet channel of Chamber B was blocked to ensure that all NPL-infused ASW flowed into Chamber A. While a flow condition enhances NPL bioavailability, a low flow rate of 1 µL/min was used because higher flow rates lead to increased NPL dosage. Additionally, a higher flow rate can introduce a substantial amount of dissolved oxygen in the water and potentially interfere with the larval oxygen measurements obtained from the on-chip chemical sensor (e.g., oxygen sensor).

A valve connected Chambers A and B (see FIG. 1A), which was normally open but was closed during experiments to separate the test species and then reopened when a sample from Chamber B (algae) was transferred to chamber A (e.g., for FE) (see also FIG. 1B). The valve included a valve seat between Chambers A and B (flow channel), a valve membrane, and a CC with a closed outlet, all stacked on top of one another (bottom to top, FIG. 1B). Water flow (infusion or withdrawal) in the CC (Qc) with one closed outlet (FIG. 1A) resulted in positive or zero pressure, forcing the valve membrane to deflect downward or upward, pressing it against the seat or getting away from the seat, and closing or reopening the valve (FIG. 1B), respectively. An in-house constructed feedback-controlled syringe pressure pump operated the valve automatically via a syringe pump, pressure sensor, and a Python-based program (FIG. 1A).

Four 3D-printed microfluidic chips were connected to a manifold, which was designed to facilitate parallel experiments. The manifold featured inlets and outlets for both Chambers A and B, as well as an inlet for the valve system. The inlets of Chambers A and B were connected to the custom-built syringe pump, which provided automated flow control when required, using an Arduino-based system. The pressure pump was also integrated with the manifold to enable automated control of the valves.

The microfluidic chip was designed using a computer-aided design (CAD) program (Autodesk Inventor Professional 2024) and fabricated as a single part (excluding the lids utilizing only 3D printing. A digital light processing (DLP) 3D printer (Asiga Max X43) was used along with a commercially available high-resolution colorless resin (Nano clear, FunToDo). A 3D printer slicer program (Asiga Composer) was used to divide the entire part into slices, and before 3D printing, each layer in the slicer was examined for missing layers. Keeping XY and Z compensation at 0 prevented or inhibited the slicer from auto-discarding any layers, particularly the valve membrane. During 3D printing, slice thickness was kept at 25 µm per layer except for one layer. Very low layer thickness increases printing time, resin usage, brittleness, and artifacts, while higher thickness reduces resolution and transparency. Due to chamber A's large volume and surface area, the initial layers above it became distorted without support, affecting transparency. This issue could not be resolved with a column support alone. Instead, it required printing only the first layer above chamber A at a 50 µm thickness along with the column support. Additionally, the burn-in layer (first layer) exposure time was optimized to 5 sec to ensure the printed part adhered adequately to the build platform while maintaining better transparency. Following the printing process, the channels and chambers of the chip were cleaned by repeatedly perfusing soapy water followed by deionized water using syringes. To enhance the cleaning, the chip was then ultrasonicated (Branson 2800) in soapy water for 1 minute. Subsequently, the channels were flushed with deionized water, followed by airflow. Finally, the chip was subjected to ultraviolet (UV) treatment for approximately 30 seconds to cure any excess resin. Isopropyl alcohol (IPA), a standard cleaning agent in resin 3D printing, was tested alone to remove residual resin from the channels. While this method required less effort, it resulted in surface damage to the channels, even after meticulously removing all remaining IPA. Consequently, this approach was not pursued further.

Following cleaning and post-curing, the bottom surface of the chip was gently polished using sequential sandpapers with grits of 400 and 1200. It was observed that applying a thin layer of immersion oil (Nikon Type B) to the polished surface further enhanced the chip's transparency.

The valve is a critical component of the chip providing automated FE. Fully 3D-printed valves pose significant challenges, primarily due to the higher pressure required to close the valve compared to PDMS-based valves. This is attributed to the significantly higher elastic modulus of the resin material used compared to PDMS, which has an elastic modulus of only about 2.5 megapascals (MPa)-2.6 MPa. Additionally, 3D-printed valves are typically designed in a normally open state. This could be an issue when the valve is used for an extended period (e.g., 3 hours), as high pressure could cause plastic deformation, resulting in valve blockage, or tearing of the membrane. Hence, in the experiments, various valve design parameters were optimized. Reducing the UV exposure of the resin can decrease the material's elastic modulus, thereby lowering the pressure required to close the valve. However, it was found that when the exposure time was reduced below the manufacturer's recommended 0.9 seconds for a 25 µm slice thickness, the valve membrane ruptured under pressure or during the post-printing cleaning step, likely due to incomplete curing. Valve membrane thickness also affects the required pressure. The thinner the membrane, the lower the pressure required to deflect it and close the valve. In the experiments, it was observed that if the valve membrane was lower than 50 µm, it ruptured and caused leakage during operation or cleaning. This could be due to artifacts during printing causing weak points leading to breakage and leaking. Therefore, a valve membrane of 50 µm was selected. A shorter gap between the valve seat and membrane minimizes the distance the valve membrane must deflect to close the valve and thus the required pressure. However, there should be sufficient opening of the valve to transfer algae to chamber A from B with just flow.

Also, it was noted that cleaning residual resin from chambers and channels was very difficult when the gap was less than 100 µm, causing tears in the valve membrane. Thus, a bow-shaped valve seat was designed to ensure conformity of the valve membrane for complete sealing of the valve (see FIG. 1B and FIG. 5), easy cleaning of the channels as well as smooth transfer of the algae. This approach can also eliminate the need for a larger valve membrane typically used in 3D-printed microfluidic valves. Another key factor is valve seat width, as increased valve seat width may hinder smooth algae flow from channel B to channel A due to higher fluidic resistance. In the experiments, a valve seat width of 400 µm was used (see also FIG. 2C). When the valve seat width was lowered to 200 µm, even at 15 kilopascal (kPa) control channel pressure, the valve did not close, indicating insufficient contact between the membrane and the seat.

The tensile properties of the 3D printer resin material (Nano clear, FunToDo) were evaluated using a tensile tester (MTS Criterion, Model 41) at a test rate of 100 millimeters per minute (mm/min) for design purposes of the valve. Test specimens were designed in accordance with ASTM D638-14 (Type V) standards and 3D printed vertically (see FIG. 8) to align with the printing direction of the valve membrane, mitigating potential directional effects on mechanical properties. Each layer of the tensile specimen was 25 µm thick (exposure time=0.9 sec). At least three specimens were tested under each condition. The resin material exhibited an ultimate strength of 19.43 MPa±2.19 MPa, an elastic modulus of 176.71 MPa±8.13 MPa, and a Poisson's ratio of 0.15±0.05.

The pressure required to close and reopen the valve was determined by gradually applying pressure to the control channel from 0 kPa to 7 kPa in 1 kPa increments using water infusion, followed by withdrawing the water to return the pressure to zero. An inflow of 2 µL/min was applied at the Chamber B inlet via a syringe pump and the outflow rate was measured at the Chamber A outlet by tracking the liquid meniscus. At this moment, the Chamber B outlet channel was open, and the Chamber A inlet and test species intake ports were closed. The inflow rate at Chamber B was doubled from the usual rate (1 µL/min) to imitate the flow from both chambers and the requisite pressure to block the flow. The valve was considered to be closed when about 99% flow was blocked. At least three valves were tested at each pressure condition. Valve membrane deflection was simulated using Autodesk Inventor Professional 2024 stress analysis.

*Artemia* cysts, purchased from Brine Shrimp Direct and stored at 4° C., were transferred to room temperature 24 hours before hatching, following the vendor's guidelines. The cysts were hatched in a beaker containing ASW at a salinity of 25 parts per thousand (ppt) by incubating them at 25° C. for 24 hours at a concentration of 5 grams per liter (g/L). During this period, the nauplii hatched and were kept unfed for one day until they were used in the chip experiments (nauplii age=1 dph). Nauplii were isolated from the cysts using a transfer pipette and inserted into Chamber A at a concentration of approximately 0.05 no. of *Artemia*/µL±0.005 no. of *Artemia*/µL (total nauplii of about 40-49 in Chamber A). A commercially available microalgae mixture (RotiGrow OneStep), consisting of five different marine algae species, was mixed with ASW and added to Chamber B, or occasionally Chamber A, to achieve a final concentration of 0.4 nanoliters per microliter (nL/µL).

Red fluorescent (TRITC) PS NPL of 300 nanometer (nm) nominal size dissolved in an aqueous solution at a concentration of 1% solids (weight per volume (w/v)) was purchased from Thermo Scientific Chemicals. The NPLs were spherical in shape, with a Z-average size of 287.24 nm±1.82 nm, a polydispersity index (PDI) of 0.18±0.04, and a Zeta potential of −0.82 millivolts (mV)+0.94 mV (mean±SD), as determined by scanning electron microscopy (SEM) and dynamic light scattering (DLS). The NPLs were dispersed in ASW using a vortex mixer (Vortex Genie), followed by ultrasonication (Branson 2800) for five minutes, at concentrations of 10 milligrams per liter (mg/L), to prepare NPL suspensions for the exposure experiments.

Exposure to both food (algae) and NPLs may influence the metabolism and oxygen consumption of *Artemia nauplii*. It is also essential to assess the oxygen consumption behavior of algae when co-located with *Artemia nauplii* in Chamber A to distinguish their individual contributions to overall oxygen consumption. To address this, the on-chip experiments were categorized as follows:

Blank: No test organisms were present, with only ASW flow for 8 hours in Chamber A.

Control-1 (*Artemia*): *Artemia nauplii* were exposed to a continuous ASW flow in Chamber A without food (algae) for 8 hours.

Control-2 (algae): To account for the oxygen consumption of algae, only algae were placed in Chamber A with ASW flow for 8 hours.

Control-3 (*Artemia* and algae): Both *Artemia nauplii* and algae were introduced into Chamber A with ASW flow for 8 hours, without NPL exposure.

WE (*Artemia*): *Artemia nauplii* were exposed to NPLs through water in Chamber A for 8 hours, without algae.

WE (algae): Algae were exposed to NPLs via water in chamber A for 8 hours, with no *Artemia nauplii* present.

FE (*Artemia* and algae): *Artemia nauplii* were placed in Chamber A with a continuous ASW flow, while algae in Chamber B were exposed to NPLs. After 3 hours of NPL exposure in Chamber B, the algae were transferred to Chamber A via valve opening, allowing direct exposure to *Artemia* for 8 hours. During this phase, only ASW flow was maintained in Chamber A, without further NPL exposure.

The dissolved oxygen concentration in the water flowing through Chamber A was continuously monitored every second using the integrated on-chip oxygen sensor. The oxygen consumption of the test organisms was determined by calculating the change in dissolved oxygen concentration between consecutive time points, referred to as the depletion in dissolved oxygen concentration (DDOC). It is important to note that, due to the typically small size of microalgae (ranging from 2 µm to 50 µm), counting the number of algae in Chamber A was not feasible. Therefore, the oxygen consumption rate was estimated using three different methods, depending on the presence of test organisms:

In a first method, rate of oxygen consumption (ROC) when only *Artemia nauplii* were present in the chip ($ROC_1$) was used:

$$ROC_1 = \frac{DDOC}{\text{Duration (8 h)} \times \text{No. of Artemia}} (\text{mg/L/h/no. of Artemia})$$

In a second method, ROC when only algae were present in the chip ($ROC_2$) was used:

$$ROC_2 = \frac{DDOC}{\text{Duration (8 h)} \times \text{Volume of algae}} (\text{mg/L/h/nL of algae})$$

In a third method, ROC when both the *Artemia nauplii* and algae were present in the chip ($ROC_3$) was used:

$$ROC_3 = \frac{DDOC}{\text{Duration (8 h)} \times \text{Volume of algae} \times \text{No. of Artemia}}$$

$$(\text{mg/L/h/nL of algae/no. of Artemia})$$

Statistical analyses were conducted using one-way analysis of variance (ANOVA), followed by Tukey's post hoc test when appropriate, using OriginPro software. A p-value of less than 0.05 was considered statistically significant.

Due to the movement of *Artemia nauplii*, which may cause them to move in and out of focus, the captured images were often not sufficiently clear for direct analysis. To address this, the following image processing steps were applied in ImageJ before calculating fluorescence intensity: i) unsharp mask, applied with a radius of 500 pixels and a mask weight of 0.6; ii) background subtraction, performed using a rolling ball radius of 200 pixels; iii) median filter, applied with a radius of 2 pixels; and iv) removal of outliers, using a radius of 30 pixels, a threshold of 50, and targeting bright outliers. Fluorescence intensity was subsequently measured using minimum thresholding, and particles within a size range of 50,000 pixels to infinity were analyzed. For the algae images, an unsharp mask with a radius of 10 pixels and a mask weight of 0.6 was applied. Fluorescence intensity was then measured using minimum thresholding, with particles in the size range from 1 pixel to infinity included in the analysis.

A syringe pump (Pico Plus 11 Elite, Harvard Apparatus) equipped with a 5 milliliter (mL) syringe (BH Supplies) was connected to a pressure sensor (Fluigent S), which was linked to the valve inlet of the microfluidic chip through a series of tubing. The operational pressure range for the valve was maintained between 0 kPa and 7 kPa. During valve operation, specifically during the 3-hour NPL exposure in Chamber B as part of the foodborne exposure experiment, the syringe pump was programmed to initiate when the valve control channel pressure fell below 7 kPa. The pump delivered fluid at a rate of 50 µL/min to increase the pressure, stopping once 7 kPa was reached. This process continued as needed to maintain the required pressure. When reopening the valve after the 3-hour exposure, the pump withdrew fluid at a rate of 50 µL/min to decrease the pressure in the control channel to 0 kPa. If the pressure rose above 0 kPa, the pump continued withdrawing until the pressure stabilized at 0 kPa. The operation of the pump was controlled using Python.

The custom syringe pump was constructed following an open-access guide (see drdflo.com/pages/Projects/Syringe-Pump.html; which is hereby incorporated by reference herein in its entirety). The mechanical components of the pump included: a) two threaded rods; b) two linear motion shafts; c) two linear ball bearings; d) two aluminum extruded linear slot bars; e) two motor shaft couplers; f) two stepper motors (Nema 17 bipolar, 1A); g) an Arduino Uno; h) an Adafruit motor shield; i) two hex nuts (M8×1.25 mm); and j) eight socket cap screws and t-nuts. The pump was equipped with two motors (motor 1 and motor 2), which could operate independently. A custom Arduino code was developed to control the pump. During foodborne exposure, motor 2 was activated to deliver NPL-infused ASW to Chamber B for 3 hours at a flow rate of 1 µL/min (4 µL/min in total for the four chips). After this, the flow rate was increased to 50 µL/min per chip (200 µL/min total) for 30 sec, during which the valve was opened, allowing the NPL-exposed algae to transfer from Chamber B to Chamber A. During this period, motor 1 continuously supplied ASW to chamber A at a flow rate of 1 µL/min per chip (4 µL/min total) and continued the supply for an additional 8 hours, resulting in a total operation time of 11 hours and 30 sec. Two 10 mL syringes (BH Supplies) were used for delivering NPL-infused ASW and ASW, respectively. The flow rates of 4 µL/min and 200 µL/min were achieved by setting the MICROSTEP to a delay of 10,000 with 150-millisecond intervals, using stepper motors with 200 steps per revolution (1.8 degrees per step) to meet the experimental conditions.

Example 1—Valve Flow Characterization and Operation

Figure 2A:
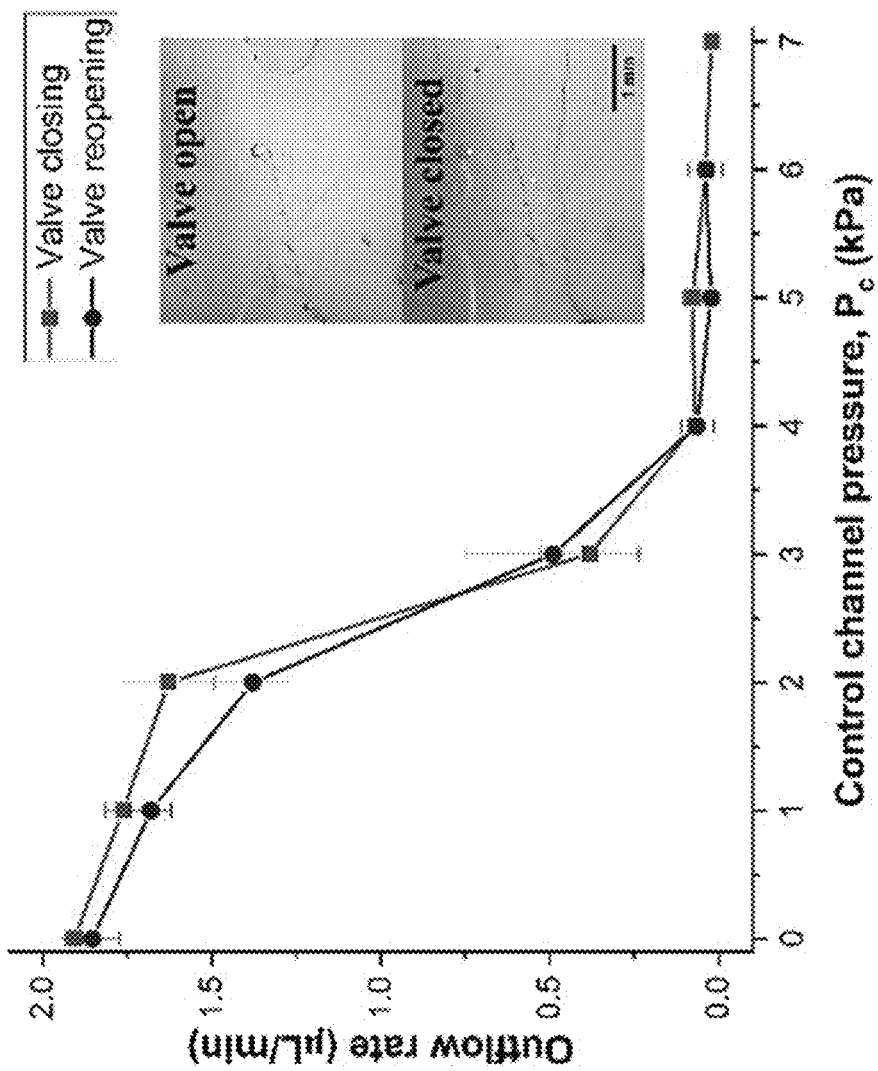
FIG. 2A shows a plot of outflow rate (in microliters per minute (µL/min) versus control channel pressure ($P_c$, in kilopascals (kPa)), showing experimental data of the outflow rates through a valve at different control channel pressures during both closing and reopening phases (n=3 valves). The curve with the square data points is for valve closing; and the curve with circular data points is for valve opening. The inset shows an image of the valve open (top) and the valve closed (bottom); the scale bar for these images is 1 millimeter (mm).

FIG. 2A presents the experimental results of applied control channel pressure ($P_C$) and the corresponding outflow rate through the valve at an inflow rate of 2 µL/min, measured using the methodology described in Materials and Methods section. The data demonstrate a rapid decrease in outflow rate with increasing PC from 0 kPa to 4 kPa, indicating a highly responsive valve membrane and gradual valve closure, resulting in up to ~96% inflow restriction at $P_C$=4 kPa. Beyond 4 kPa, the rate of outflow reduction diminished, likely due to leakage around the valve seat edges caused by nonuniform membrane deflection. However, at $P_C$=7 kPa, with an outflow rate of 0.02 L/min±0.02 L/min, 99% of the inflow is blocked, identifying this pressure as optimal for complete valve closure in the experiments. After 3 hours, as $P_C$ was gradually reduced, the valve reopened, and the outflow rate remained consistent with initial measurements. This indicates that the valve membrane returned to its original state, showing negligible plastic deformation within the tested pressure range and duration. Simulation results of valve membrane deflection in the Y direction (FIG. 2B) show a similar trend with varying applied pressures. At $P_C$=7 kPa, the valve membrane deflection and deflected area were sufficient to cover the valve seat area, achieving nearly complete valve closure.

Figure 2B:
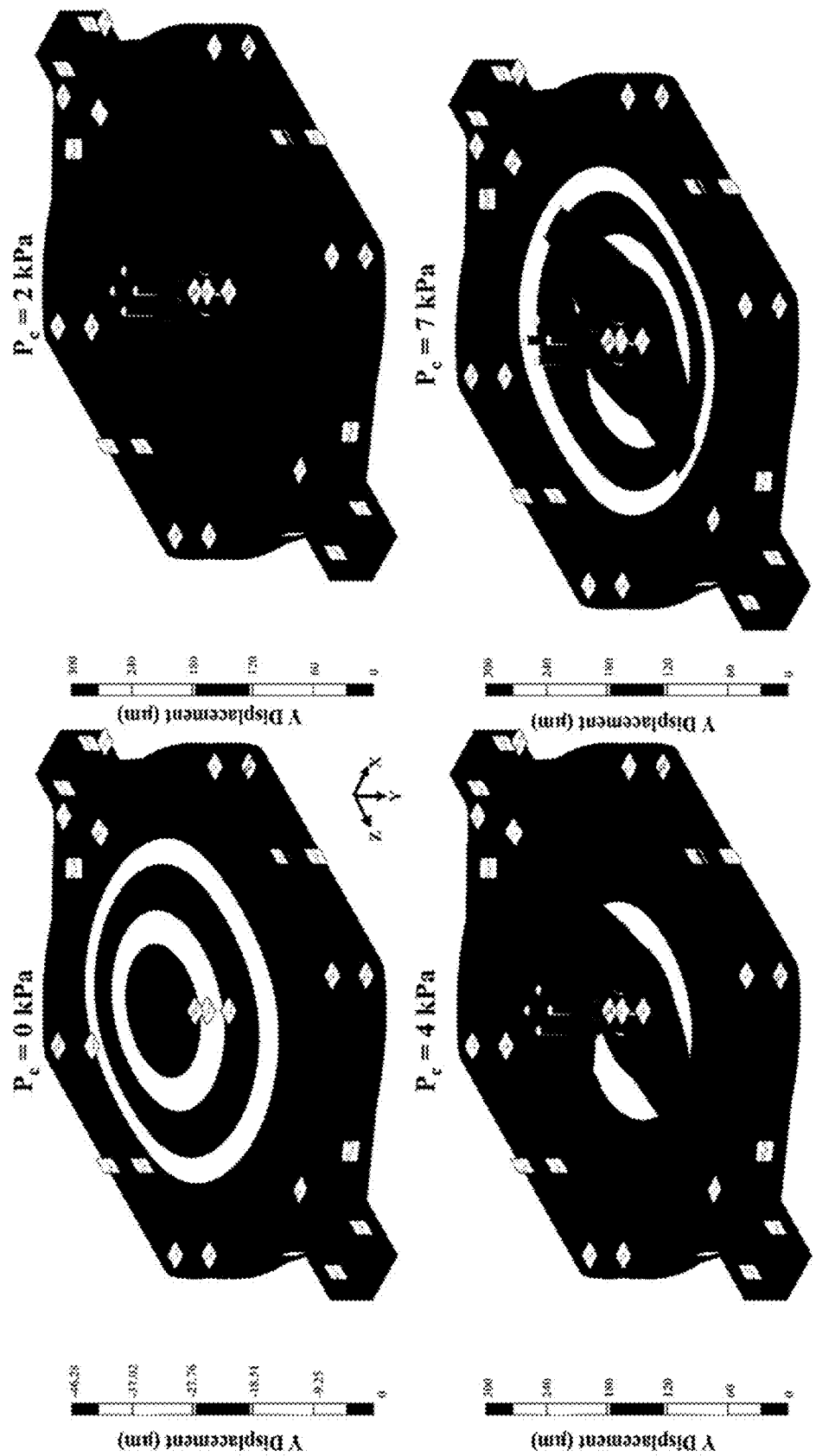
FIG. 2B shows simulation results of membrane deflection in the Y-direction under varying control channel pressures (clockwise from top left, the $P_c$ values are 0 kPa, 2 kPa, 7 kPa, and 4 kPa).
Figure 2C:
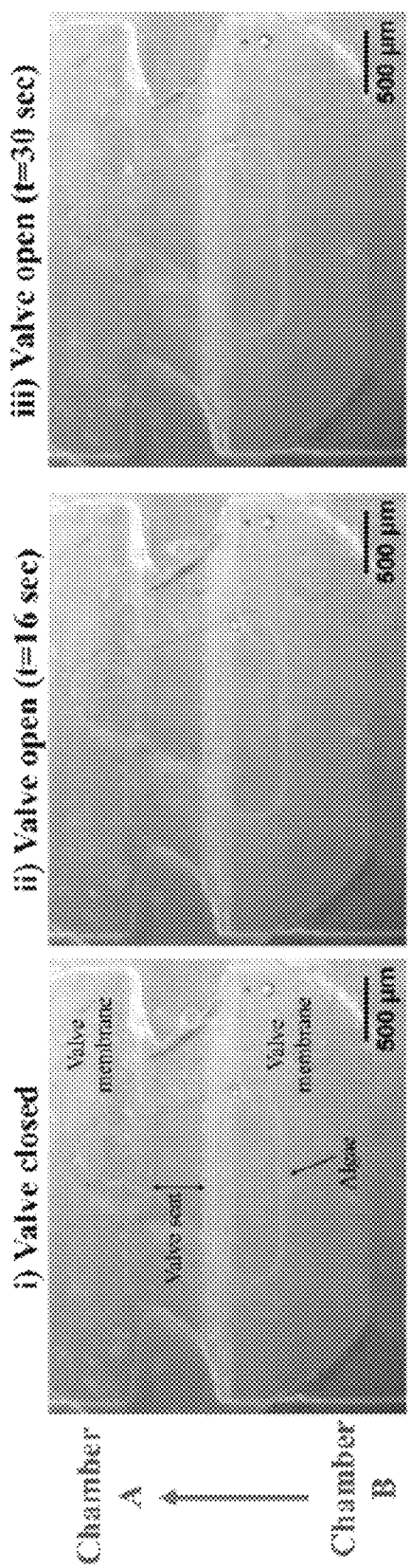
FIG. 2C shows images of valve operation for containing and transferring algae from Chamber B to Chamber A (bottom to top as depicted in FIG. 2C). The left image shows the case of the valve being closed, the middle image shows the case of 16 seconds (sec) of the valve being open; and the right image shows the case of 30 sec of the valve being open.

FIG. 2C shows the valve operation of the chip when algae are present in Chamber B. When the valve is closed, it restricts the movement of algae within Chamber B and the shallow channel connecting the valve to Chamber B (left side of FIG. 2C). Upon opening the valve, the flow from Chamber B propels algae across the valve seat and into Chamber A (middle of FIG. 2C). Notably, during the transfer, the inflow rate into Chamber B was increased from 1 µL/min to 50 µL/min to facilitate quicker transfer. Within 30 sec, nearly all algae had moved to Chamber A, except for a few that became trapped around the center of the valve membrane (right side of FIG. 2C), probably due to the higher deflection of the membrane at its center compared to its edges (FIG. 2B). It is important to note that, due to the small size of the microalgae (ranging from 2 µm to 50 µm) and the relatively larger dimensions of the micropillar array gap (125 µm in width and 100 µm in height), some algae may have escaped from the chip through the Chamber B outlet during the transfer process.

Example 2—Uptake and Bioaccumulation of NPLs

Figure 3A:
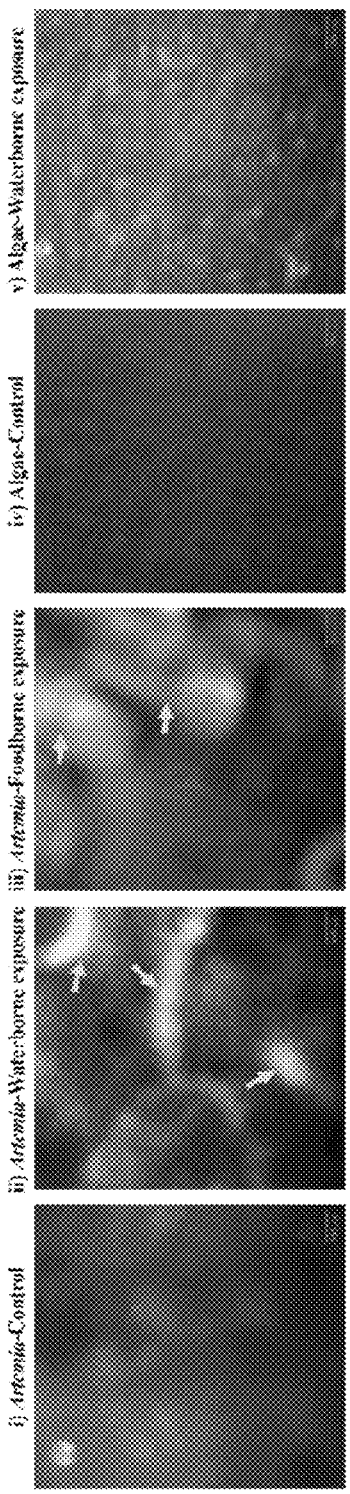
FIG. 3A shows fluorescence images depicting the uptake of nanoplastics (NPLs). The first three images show the uptake of NPLs in *Artemia nauplii* compared to the control group (left-most image), through waterborne exposure pathways (image that is second from the left; arrows indicate fluorescence-labeled NPLs bioaccumulated in the moving nauplii), and through foodborne exposure pathways (middle image; arrows indicate fluorescence-labeled NPLs bioaccumulated in the moving nauplii). The second image from the right shows algae NPL uptake in comparison to control, and the right-most image shows algae NPL uptake through waterborne exposure. The scale bar in all five images is 250 nanometers (nm).
Figure 3B:
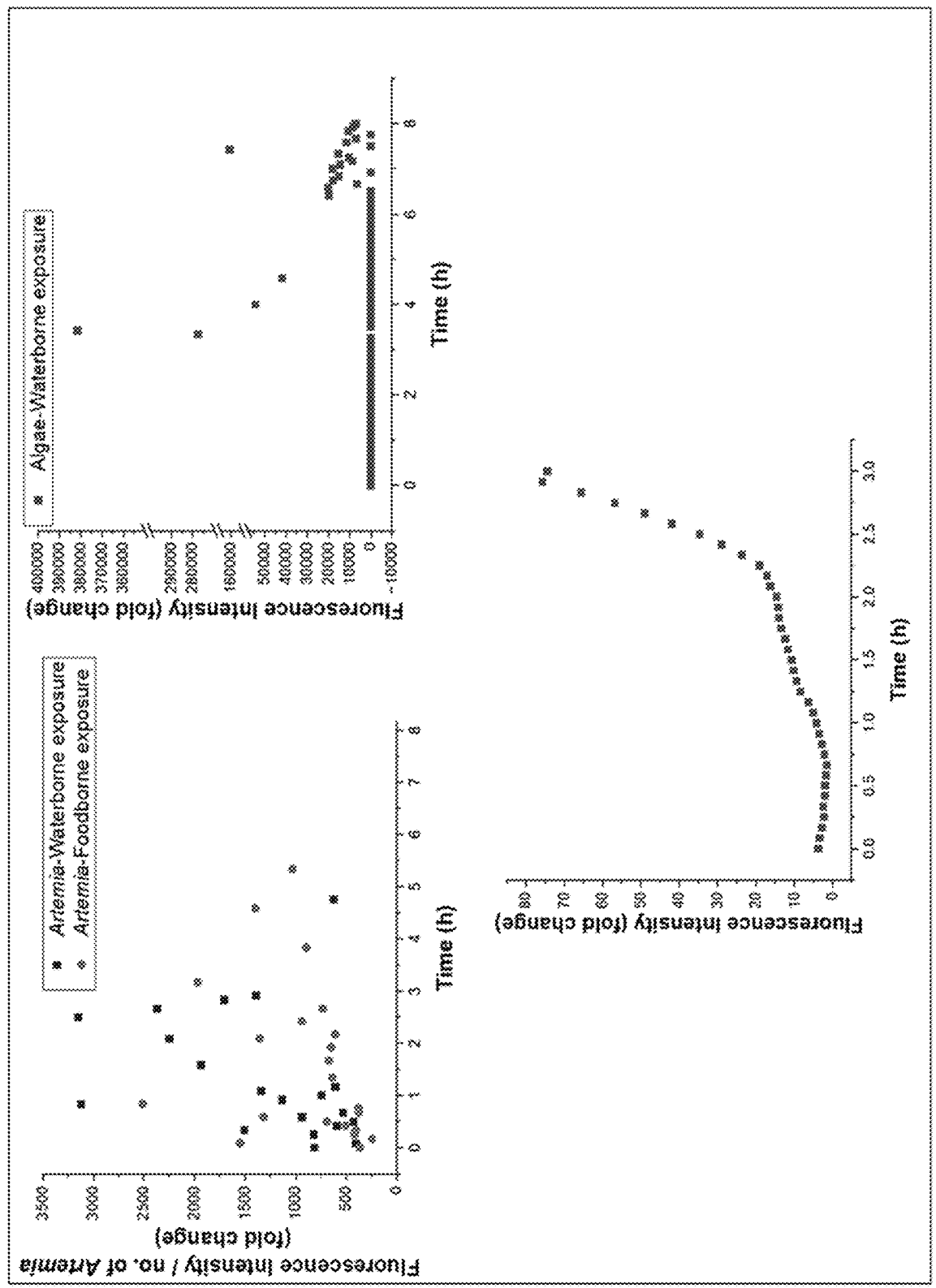
FIG. 3B shows a plot of fluorescence intensity per number of *Artemia* (fold change) versus time (in hours (h)) on the left and a plot of fluorescence intensity (fold change) versus time (in h) for algae (from water exposure) on the right. In the plot on the left, the square data points are for *Artemia* waterborne exposure, and the circular data points are for *Artemia* foodborne exposure. In the plot on the right, all data points are for algae waterborne exposure. The fluorescence intensity data illustrate the time-dependent uptake and bioaccumulation of NPLs in *Artemia nauplii* (left) and algae (right).

FIGS. 3A and 3B illustrate the uptake and bioaccumulation of NPLs in *Artemia nauplii* (through both WE and FE) and in algae (via WE) during on-chip NPL exposure experiments. Fluorescence images in FIG. 3A reveal a significant uptake of NPLs in swimming *Artemia nauplii* compared to the control group (leftmost image in FIG. 3A), with significant fluorescence observed in both WE and FE exposure routes (image that is second from the left in FIG. 3A and the middle image in FIG. 3A), as indicated by bright regions absent in the control images. Similarly, in algae exposed via WE, the presence of bright fluorescent spots signifies substantial NPL uptake (image that is second from the right in FIG. 3A), which is not evident in the control group (rightmost image in FIG. 3A).

The fluorescence intensity measurements shown in FIG. 3B further support these observations, illustrating the variation in fluorescence intensity over the 8-hour experimental period in *Artemia nauplii* under both WE and FE routes (left plot in FIG. 3B), as well as in algae (right plot in FIG. 3B). It is noted that the results are presented as fold changes relative to the control group. For *Artemia*, fluorescence intensity was calculated on a per-nauplius basis. However, due to the very small size of the algae, as previously mentioned, it was not feasible to determine fluorescence intensity per individual algal cell. Instead, the overall fluorescence was measured. In *Artemia nauplii*, a significant NPL uptake was observed through both exposure routes, with fold changes ranging from approximately 250 to 3,150, depending on the time and route of exposure (left plot in FIG. 3B). While there was variability probably due to differences in intake by individual nauplii and the high number of nauplii in the chamber (about 40-49), the overall trend indicated that NPL uptake via WE increased over time up to about 2.5 hours, followed by a decline. As nonselective filter feeders, *Artemia nauplii* typically ingest particles smaller than 50 µm via sieving through their antennae, especially starting from the instar-II stage, a behavior that aligns with the findings of the experiments. Following uptake, *Artemia nauplii* have been observed to egest NPLs through feces. The decline in NPL uptake observed after 2.5 hours is likely due to a reduction in uptake relative to the rate of nanoparticle egestion. This phenomenon may be associated with gut constriction, intestinal damage, apoptosis of intestinal cells, and/or DNA damage, among other potential adverse effects. In contrast, no decline in NPL uptake was observed in the FE group, where the overall accumulation continued to increase over time. The high consumption rate of algae by *Artemia* may reflect a compensatory feeding response, as the nauplii attempt to offset the ingestion of nutritionally inert materials (NPLs) to meet their minimal nutritional requirements. This compensatory feeding behavior could contribute to the increased NPL accumulation observed during foodborne exposure. As shown in the left plot in FIG. 3B, no data points are available beyond approximately 5.34 hours for both WE and FE. This is because *Artemia nauplii* were no longer visible in the microscope frame beyond that time. Many nauplii were observed to have settled at the bottom of the chamber and exhibited reduced movement or were probably dead, likely due to the toxic effects of NPLs, making it unfeasible to measure their fluorescence intensity. It is known that PS NPLs can induce mortality, likely through mechanisms such as cell apoptosis triggered by cathepsin L-like protease, elevated reactive oxygen species (ROS) production, and subsequent oxidative stress. This oxidative stress increases catalase (CAT) enzyme activity while reducing superoxide dismutase (SOD) activity, leading to lipid membrane damage and lipid peroxidation. Reduced swimming behavior may serve as a protective response to environmental stressors or result from physiological impairments, including visual and neuromotor dysfunction. The relatively large size of the NPLs (300 nm), combined with their high concentration (10 mg/L), likely facilitated their rapid uptake by these filter feeders, potentially accelerating the observed impacts. Prolonged starvation before the experiments may have also contributed to these effects.

Similarly, a substantial bioaccumulation of NPLs was observed in algae via WE, as indicated by the significant fold increase in fluorescence intensity compared to the control group (right plot in FIG. 3B). The inset in the right plot in FIG. 3B highlights NPL bioaccumulation in algae during the first 3 hours of exposure, as algae were exposed to NPLs before being used for FE to *Artemia nauplii*. The results show an initial slow accumulation, followed by a rapid increase, reaching approximately 75-fold within 3 hours. NPLs primarily interact with algae due to their small size and high surface area, which promotes their adherence to the algal surface, facilitating the formation of hetero-aggregates. These interactions are driven by electrostatic attraction and non-Derjaguin-Landau-Verwey-Overbeek (non-DLVO) forces, further increasing the likelihood of aggregation and bioaccumulation within the algal cells. Additionally, NPLs adhered to the algal surface may be internalized, particularly in cells with high membrane permeability and capacity for endocytosis.

Example 3—Impacts of NPLs on Oxygen Consumption

Oxygen is essential for energy production via cellular respiration, and hence it can be used as a critical marker for assessing metabolic rate and detecting changes in respiratory function in aquatic species under NPL exposure. For instance, oxygen consumption rates can be used as a key metric in nanotoxicity assessments across various species, including fish like *Oreochromis niloticus* (tilapia), mollusks such as *Chlamys farreri* (scallops), and mussels like *Mytilus galloprovincialis*. The oxygen consumption patterns of *Artemia nauplii* were investigated under WE to different types of nanoparticles (NPs) during the hatching process and immediately post-hatching. The results demonstrated that NP exposure significantly influenced the oxygen consumption rate, suggesting a substantial effect on the metabolic processes and/or respiratory function of both the cysts and nauplii.

Figure 4A:
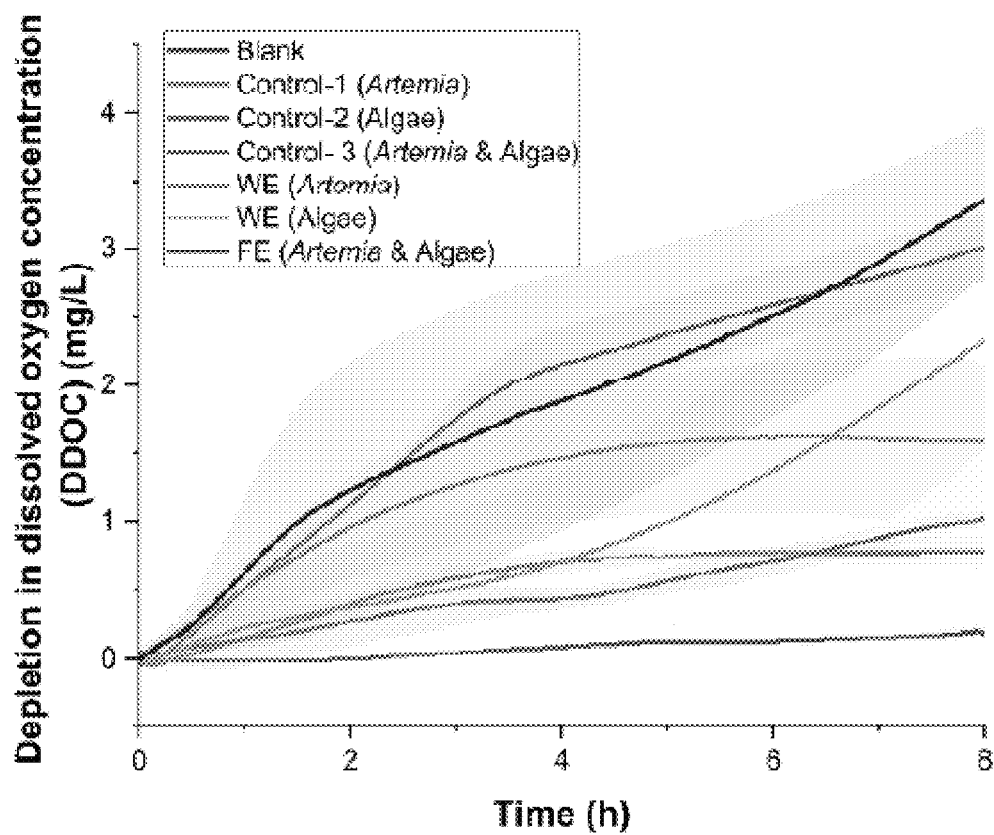
FIG. 4A shows a plot of depletion in dissolved oxygen concentration (DDOC) (in milligrams per liter (mg/L)) versus time (in h), showing the effects of NPLs on oxygen consumption. DDOC was used to measure oxygen consumption under various exposure conditions in test organisms. The solid lines represent the average DDOC for each exposure condition, while the shaded areas indicate the standard deviation (n≥3). In the legend, WE refers to waterborne exposure, and FE refers to foodborne exposure. The curve with the lowest DDOC at a time of 8 h is for blank; the curve with the second-lowest DDOC at a time of 8 h is for control-1 (*Artemia*); the curve with the third-lowest DDOC at a time of 8 h is for control-2 (algae); the curve with the fourth-lowest DDOC at a time of 8 h is for WE (*Artemia*); the curve with the third-highest DDOC at a time of 8 h is for WE (algae); the curve with the second-highest DDOC at a time of 8 h is for control-3 (*Artemia* and algae); and the curve with the highest DDOC at a time of 8 h is for FE (*Artemia* and algae).
Figure 4B:
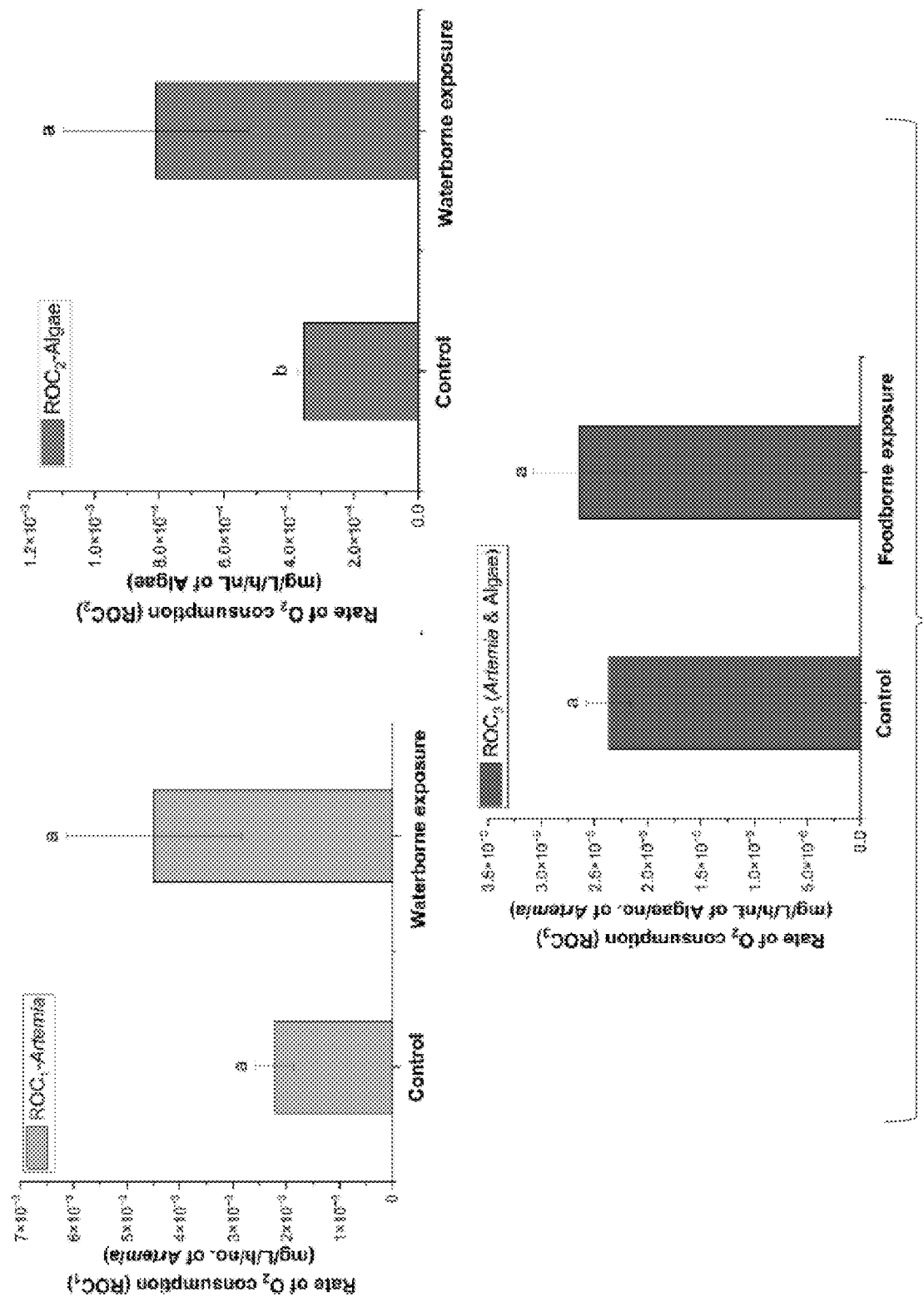
FIG. 4B shows three bar charts of rate of oxygen consumption (ROC). In the top left, the ROC (in milligrams per liter per hour (mg/L/h) per number of *Artemia*) is shown, with the left bar being for control and the right bar being for waterborne exposure *Artemia*. In the top right, the ROC (in mg/L/h per nanoliter (nL) of algae) is shown, with the left bar being for control and the right bar being for waterborne exposure in algae. In the bottom, the ROC (in mg/L/h per number of *Artemia* and mg/L/h/nL of algae) is shown, with the left bar being for control and the right bar being for foodborne exposure *Artemia* and algae (n≥3).

FIGS. 4A and 4B show the oxygen consumption behavior of *Artemia nauplii* at 1-dph (instar II and III stages) and microalgae, studied within the 3D-printed microfluidic chip under varying NPL exposure conditions. FIG. 4A shows the DDOC in water within the chip, containing either test organisms or no organisms (blank), over an 8 hour period. The blank experiment shows a negligible change in DDOC, indicating a consistent level of dissolved oxygen in the flowing water within the chip, with no significant oxygen exchange from external sources or consumption by any microorganisms, if present. In both control groups, Control-1 (*Artemia*) and Control-2 (algae), oxygen consumption was significantly higher compared to the blank, demonstrating the system's ability to monitor real-time oxygen consumption within the chip. In Control-1 (*Artemia*), average DDOC increased gradually until around 4 hours, after which fluctuations diminished, suggesting a reduction in oxygen consumption. The initial high rate of oxygen consumption may be attributed to increased nauplii mobility, likely driven by environmental changes (from beaker to chip), leading to heightened metabolic demand. As the nauplii acclimatized, the infusion of fresh ASW within the chip appeared to meet their oxygen needs. In the case of WE (*Artemia*), the nauplii displayed higher oxygen consumption compared to Control-1. The average DDOC initially rose rapidly, similar to the control group, but later stabilized. This stabilization is likely a result of observed reduced mobility or mortality among many nauplii exposed to NPLs, thereby reducing their metabolic activity and thus oxygen consumption. Consequently, this led to a plateau in overall oxygen consumption after a certain time point.

For Control-2 (algae), oxygen consumption increased steadily over the experimental period. However, under WE (algae) conditions, the average DDOC increased significantly over time compared to Control-2, suggesting elevated oxygen consumption under NPL exposure. The increased oxygen consumption observed with NPL exposure in *Artemia nauplii* and algae could be linked to NPL accumulation, which may result in structural damage such as gill lamellae fusion, aneurysm, necrosis, apoptosis, and other histological alterations affecting respiratory function. These factors could reduce the surface area available for gas exchange and increase the oxygen diffusion distance, requiring higher oxygen demand for osmoregulation. Also, NPLs can induce oxidative stress, neurotoxicity, and tissue damage, which negatively impact physiological processes and can lead to increased metabolic activity and consequently elevated oxygen consumption. In the comparison between Control-3 (*Artemia* and algae) and FE, there was no significant difference in oxygen consumption behavior, with both showing a steady increase over time. As expected, the average DDOC was notably higher for the combined test species compared to the individual organisms in both the control and WE groups. As shown in FIGS. 3A and 3B and discussed in Example 2, the uptake of NPL-exposed algae by *Artemia nauplii* did not decline over time to offset their increased energy demands, until the many nauplii became immobile or died, preventing or inhibiting further measurements at the end of the experiments. This reduction in activity or mortality would generally lead to lower oxygen consumption. However, the similar oxygen consumption patterns in FE compared to the control indicate that the higher oxygen demand observed was primarily driven by the metabolic impacts of NPL exposure. The lack of significant effects during the initial experimental period may be attributed to the extended time required for the digestion of algae, possibly leading to reduced interaction with NPLs during this phase.

FIG. 4B presents a comparison of the ROC between different exposure groups, normalized by the number of *Artemia nauplii* or the volume of the algae mixture to better assess oxygen consumption behavior. The average ROC per *Artemia* in the WE group was higher than that in the control group ($2.21 \times 10^{-3}$ milligrams per liter per hour per number of *Artemia* (mg/L/h/no. of *Artemia*) vs. $4.5 \times 10^{-3}$ mg/L/h/no. of *Artemia*), though this difference was not statistically significant at a 95% confidence level due to the higher variability in the NPL-exposed WE group. In contrast, the ROC for the NPL-exposed algae in the WE group was significantly higher compared to the control. The elevated oxygen consumption in both NPL-exposed groups can be attributed to the various negative impacts of NPL exposure. Further, the ROC of the FE group did not exhibit any statistically significant changes compared to the control, likely due to the reduced activity of immobile or dead nauplii at the end of the experiment.

In the examples, a fully 3D-printed microfluidic chip was developed for automated, multi-route in vivo, real-time, in situ NPLs toxicity testing. The chip was utilized to assess the toxicity of model PS NPLs at different trophic levels over a short period (8 hours). *Artemia nauplii* and a mixture of microalgae were selected to represent higher and lower trophic levels, respectively. The chip enabled real-time monitoring of NPL uptake through fluorescence imaging of the labeled NPLs, as well as oxygen consumption via an integrated oxygen sensor.

Significant uptake and bioaccumulation of NPLs were observed in both test organisms, with uptake dynamics varied over time. WE showed an increasing trend in NPL uptake until a certain point, after which it declined, likely due to decreased uptake relative to egestion as a result of gut and bodily damage. In contrast, FE displayed a continuous increase in NPL uptake, potentially driven by the need to meet the additional nutritional demand caused by NPL exposure. After approximately 5.34 hours, many nauplii were found motionless at the bottom of the chip, possibly as an escape response to the toxic environment or due to mortality.

The DDOC results demonstrated the chip's capability to monitor oxygen consumption in flow conditions. Both *Artemia nauplii* and algae exhibited higher oxygen consumption trends under WE compared to the control group, reflecting metabolic stress and/or impaired respiratory function from NPL exposure. However, the FE group showed minimal differences in oxygen consumption relative to the control, likely due to initial non-interaction with NPLs due to prolonged algae digestion and later balancing of metabolic stress by the decreased activity of immobile or dead nauplii.

The 3D-printed microfluidic chip offers a streamlined "one-step, one-part" fabrication method, eliminating the need for the complex, time-consuming soft-lithography process typically required for PDMS-based microfluidic devices. This enhances accessibility for non-professionals and facilitates batch production. In the experiments, the controlled environment, along with real-time monitoring through imaging and oxygen sensing, enabled a detailed mechanistic understanding of nanotoxicity testing in flow exposure conditions. Additionally, the use of a manifold allowed for parallel experiments, reducing both operational time and costs. The platforms of embodiments of the subject invention present a versatile tool with potential applications ranging from assessing the effects of various contaminants and drug discovery to investigating aquatic species' development and behavior in response to different stimuli.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A system chip configured for in vivo nanotoxicity testing, the system comprising:
a microfluidic chip that comprises:
a first chamber;
a first inlet channel connected to the first chamber;
a first outlet channel connected to the first chamber;
a second chamber;
a second inlet channel connected to the second chamber;
a second outlet channel connected to the second chamber; and
a valve disposed between the first chamber and the second chamber;
a control channel connected to the valve;
a first pump configured to control the valve via the control channel; and
a chemical sensor connected to the first chamber.

2. The system according to claim 1, the chemical sensor being an optical oxygen sensor, and
the optical oxygen sensor being configured to measure in real-time a dissolved oxygen concentration of a fluid in the first chamber.

3. The system according to claim 2, the optical oxygen sensor comprising an oxygen molecule-sensitive dye, an optical fiber, and an oxygen meter.

4. The system according to claim 1, the first pump being a syringe pressure pump.

5. The system according to claim 1, the first chamber comprising a first intake port configured to intake a first biological sample, and
the second chamber comprising a second intake port configured to intake a second biological sample.

6. The system according to claim 1, further comprising:
a second pump configured to supply a first fluid to the first chamber via the first inlet channel; and a third pump configured to supply a second fluid to the second chamber via the second inlet channel.

7. The system according to claim 6, the first pump, the second pump, and the third pump all being controlled via an automated flow control.

8. The system according to claim 1, further comprising:
a film heater configured to regulate a temperature of a fluid within at least one of the first chamber and the second chamber; and
a controller connected to the film heater and configured to control the film heater.

9. The system according to claim 1, the first inlet channel comprising a first plurality of micropillars where the first inlet channel meets an entrance to the first chamber, and
the second inlet channel comprising a second plurality of micropillars where the second inlet channel meets at an entrance to the second chamber.

10. The system according to claim 1, the valve being a normally open valve that is configured to be closed during at least a portion of in vivo nanotoxicity testing.

11. The system according to claim 1, the microfluidic chip being a monolithic structure such that the first chamber, the first inlet channel, the first outlet channel, the second chamber, the second inlet channel, the second outlet channel, and the valve are all part of the monolithic structure.

12. The system according to claim 1, further comprising a fluorescence microscope disposed proximate to the microfluidic chip and configured to capture microscopic images of a sample within the microfluidic chip during in vivo nanotoxicity testing.

13. A method for in vivo nanotoxicity testing, the method comprising:
providing the system according to claim 12;
closing the valve;
providing a first fluid to the first chamber via the first inlet;
providing a second fluid to the second chamber via the second inlet, where at least one of the first fluid and the second fluid comprises nanoparticles (NPs);
providing a first biological sample to the first chamber;
providing a second biological sample to the second chamber;
capturing microscopic images of the first biological sample and the second biological sample using the fluorescence microscope; and
measuring in real-time a dissolved oxygen concentration of the first fluid in the first chamber.

14. The method according to claim 13, the first fluid being salt water,
the second fluid being salt water, and
the NPs being nanoplastics (NPLs).

* * * * *